(12) United States Patent
Ganti et al.

(10) Patent No.: US 9,058,607 B2
(45) Date of Patent: Jun. 16, 2015

(54) USING NETWORK SECURITY INFORMATION TO DETECTION TRANSACTION FRAUD

(75) Inventors: Visweswararao Ganti, Plano, TX (US); John Hans Van Arkel, Colorado Springs, CO (US); Adam Young, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 683 days.

(21) Appl. No.: 12/970,174

(22) Filed: Dec. 16, 2010

(65) Prior Publication Data

US 2012/0158541 A1    Jun. 21, 2012

(51) Int. Cl.
G06Q 99/00      (2006.01)
G06Q 30/00      (2012.01)
H04L 29/06      (2006.01)
G06Q 30/06      (2012.01)

(52) U.S. Cl.
CPC ............ *G06Q 30/0185* (2013.01); *G06Q 30/06* (2013.01); *G06Q 30/0609* (2013.01); *H04L 63/1425* (2013.01)

(58) Field of Classification Search
CPC .......................... G06Q 30/06; G06Q 30/0609
USPC ................................................. 705/26.35, 64
See application file for complete search history.

(56) References Cited

U.S. PATENT DOCUMENTS

| | | | | |
|---|---|---|---|---|
| 6,157,707 A | * | 12/2000 | Baulier et al. ................. | 379/189 |
| 6,330,546 B1 | * | 12/2001 | Gopinathan et al. ............ | 705/35 |
| 7,383,224 B2 | * | 6/2008 | Huennekens et al. .......... | 705/39 |
| 7,620,592 B2 | * | 11/2009 | O'Mara et al. ................. | 705/38 |
| 7,657,482 B1 | * | 2/2010 | Shirey et al. .................... | 705/38 |
| 7,774,842 B2 | * | 8/2010 | Mahone et al. ................. | 726/22 |
| 7,860,783 B2 | * | 12/2010 | Yang et al. ....................... | 705/38 |
| 7,953,658 B2 | * | 5/2011 | Huennekens et al. .......... | 705/38 |
| 8,036,981 B2 | * | 10/2011 | Shirey et al. .................... | 705/38 |
| 8,065,233 B2 | * | 11/2011 | Lee et al. ......................... | 705/44 |
| 8,078,515 B2 | * | 12/2011 | John .............................. | 705/35 |
| 8,660,954 B2 | * | 2/2014 | Neto et al. ....................... | 705/44 |
| 2002/0161711 A1 | * | 10/2002 | Sartor et al. .................... | 705/51 |
| 2003/0004866 A1 | * | 1/2003 | Huennekens et al. .......... | 705/38 |
| 2005/0278550 A1 | * | 12/2005 | Mahone et al. ............... | 713/189 |

(Continued)

OTHER PUBLICATIONS

41st Parameter, "Proven Fraud Detection and Intervention", http://the41st.com, Nov. 16, 2010 (print date) 2 pages.

(Continued)

*Primary Examiner* — James D Nigh

(57) ABSTRACT

A fraud management system is configured to store rules for detecting fraud. The fraud management system is further configured to receive a transaction involving a consumer and a merchant; obtain network security information associated with malicious activity in a voice network or a data network, where the network security information indicates that the consumer has been involved in malicious activity in the voice network or in the data network; select a subset of rules based on the network security information and information associated with the transaction, the merchant, or the consumer; process the transaction using the subset of rules to generate alarms; process the alarms to generate a fraud score for the transaction; and output information regarding the fraud score to the merchant to assist the merchant in determining whether to accept, deny, or fulfill the transaction.

20 Claims, 13 Drawing Sheets

(56) References Cited

U.S. PATENT DOCUMENTS

| | | | |
|---|---|---|---|
| 2007/0106580 A1* | 5/2007 | Yang et al. | 705/35 |
| 2008/0046334 A1* | 2/2008 | Lee et al. | 705/26 |
| 2008/0195530 A1* | 8/2008 | Huennekens et al. | 705/38 |
| 2008/0275748 A1* | 11/2008 | John | 705/7 |
| 2009/0012896 A1* | 1/2009 | Arnold | 705/39 |
| 2011/0270752 A1* | 11/2011 | Neto et al. | 705/44 |

OTHER PUBLICATIONS

Actimize Inc., "Fraud Prevention Solutions", http://www.actimize.com/index.aspx?page=solutionsfraud, Nov. 16, 2010 (print date), 14 pages.

Arcot, "The Industry's Largest Cloud-based Authentication System", http://arcot.com, Nov. 16, 2010 (print date) 5 pages.

Entrust, "Authentication & Fraud Detection", http://www.entrust.com/authentication-fraud-detection/index.htm, Nov. 16, 2010 (print date), 13 pages.

Digital Resolve, "360° Protection Against Online Fraud & Identity Theft", http://www.digitalresolve.com, Nov. 16, 2010 (print date), 2 pages.

Iovation Inc., "The Power of Reputation", http://www.iovation.com, Nov. 16, 2010 (print date), 8 pages.

Guardian Analytics, "Cyber Criminals Are Out There, Waiting to Attack", http://www.guardiananalytics.com, Nov. 16, 2010 (print date), 2 pages.

EMC Corporation, "Securing Virtualization and the Cloud", http://www.rsa.com, Nov. 16, 2010 (print date), 4 pages.

Accertify, Inc., "Fraud prevention is streamlined. End-users are empowered", http://www.accertify.com, Nov. 16, 2010 (print date), 2 pages.

Wikipedia, "AAA protocol", http://en.wikipedia.org/wiki/AAA_protocol, Nov. 20, 2010, 3 pages.

Wikipedia, "Botnet", http://en.wikipedia.org/wiki/Bonet, Nov. 25, 2010, 10 pages.

Wikipedia, "Device Fingerprint", http://en.wikipedia.org/wiki/Device_fingerprint, Nov. 23, 2010, 3 pages.

Wikipedia, "Honeypot (computing)", http://en.wikipedia.org/wiki/Honeypot_(computing), Nov. 19, 2010, 5 pages.

Wikipedia, "Geocoding", http://en.wikipedia.org/wiki/Geocoding, Nov. 27, 2010 (print date), 1 page.

* cited by examiner

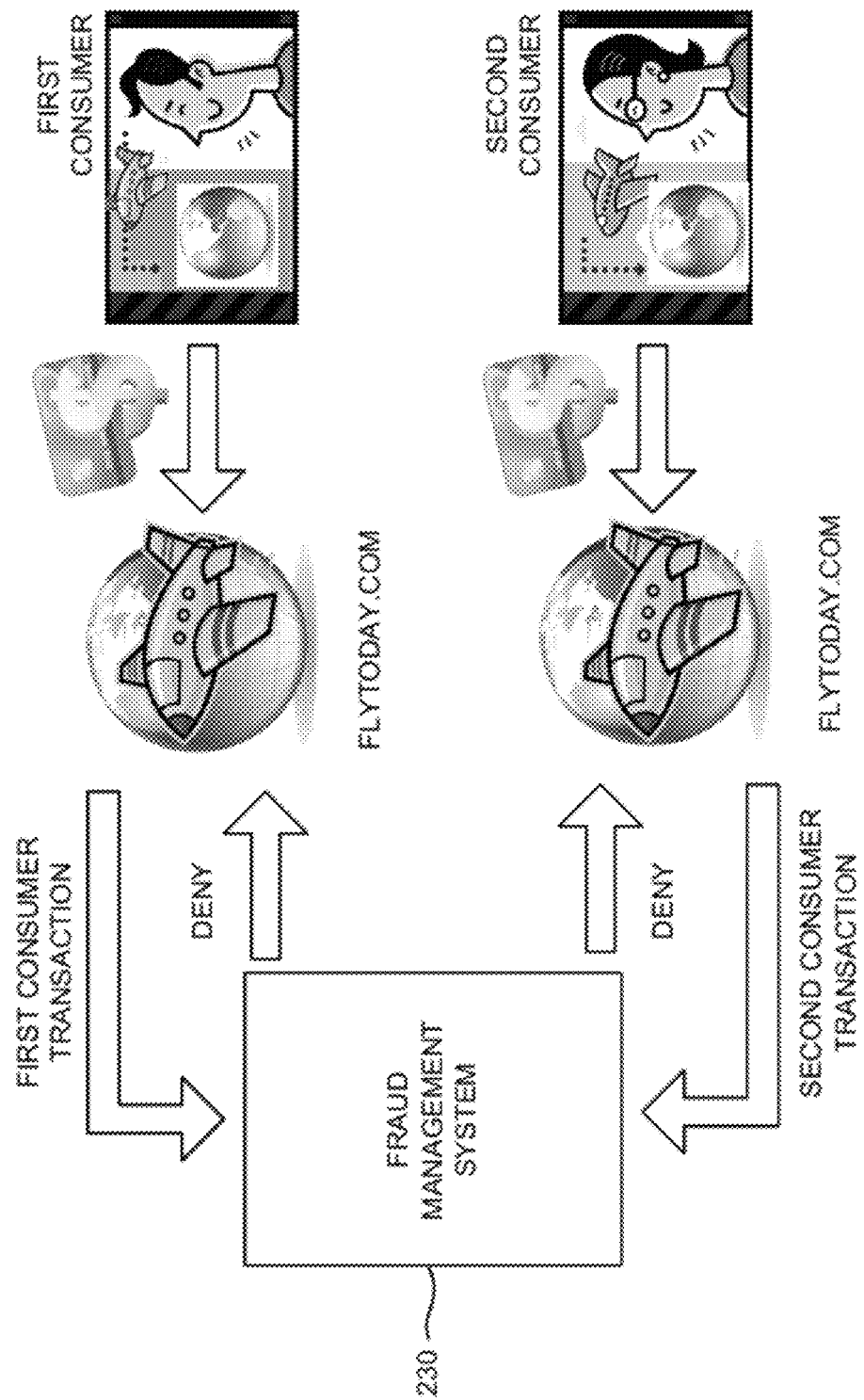

US 9,058,607 B2

USING NETWORK SECURITY INFORMATION TO DETECTION TRANSACTION FRAUD

BACKGROUND

Merchants are much more responsible for the cost of fraud than are financial institutions and consumers. Accordingly, merchants are the most motivated victim group to adopt mitigation strategies. The mitigation strategies vary for online merchants as compared to the "brick and mortar" merchants. For example, online merchants typically employ a mixture of purchased and internally developed software solutions and manage significant fraud operations and claims management departments. "Brick and mortar" merchants adopt different mitigation strategies, where in-person interactions with consumers are possible. The techniques used to commit fraud against merchants are ever-changing. Thus, fraud protection, adopted by merchants, needs to be constantly adapting to the ever-changing fraud techniques.

BRIEF DESCRIPTION OF THE DRAWINGS

FIGS. 12 and 13 are diagrams illustrating an example for identifying a fraudulent transaction.

DETAILED DESCRIPTION OF PREFERRED EMBODIMENTS

The following detailed description refers to the accompanying drawings. The same reference numbers in different drawings may identify the same or similar elements.

An implementation, described herein, may detect a fraudulent transaction, from a merchant, by analyzing information gleaned by performing network security and/or network protection functions in a voice and/or data network. In one implementation, the network security and/or network protection functions may provide valuable information regarding malicious devices and/or malicious traffic associated with the voice/data network. This information may be used in determining whether a transaction, between a consumer and a merchant, occurring via the merchant's website, is fraudulent.

Figure 1:
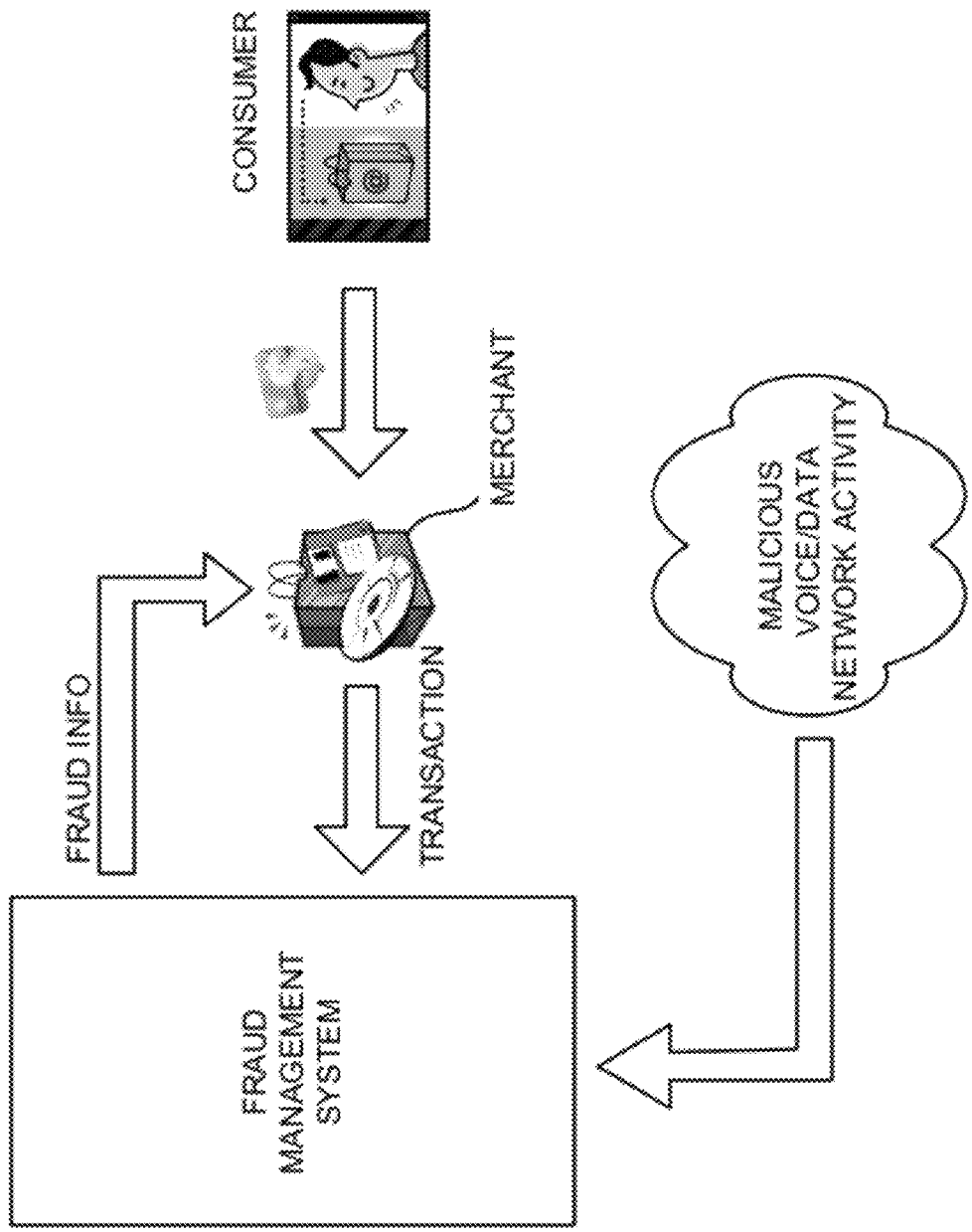
FIG. 1 is a diagram of an overview of an implementation described herein.

FIG. 1 is a diagram of an overview of an implementation described herein. For the example of FIG. 1, assume that a consumer makes an online purchase of electronic goods via a website of a merchant. To complete the online purchase of the electronic goods, the consumer may provide credit or debit card information to the merchant.

The merchant may provide information regarding the transaction to a fraud management system. The term "transaction," as used herein, is intended to be broadly interpreted to include an interaction of a consumer with a merchant. The interaction may involve the payment of money, a promise for a future payment of money, the deposit of money into an account, or the removal of money from an account. The term "money," as used herein, is intended to be broadly interpreted to include anything that can be accepted as payment for goods or services, such as currency, coupons, credit cards, debit cards, gift cards, and funds held in a financial account (e.g., a checking account, a money market account, a savings account, a stock account, a mutual fund account, a paypal account, etc.). In one implementation, the transaction may involve a one time exchange of information, between the merchant and the fraud management system, which may occur at the completion of the interaction between the consumer and the merchant (e.g., when the consumer ends an online session with the merchant). In another implementation, the transaction may involve a series of exchanges of information, between the merchant and the fraud management system, which may occur during and/or after completion of the interaction between the consumer and the merchant.

The fraud management system may obtain information regarding malicious network activity (e.g., involving malicious devices, malicious traffic, malicious users, etc.) in a voice and/or data network (hereinafter "network security information"). For example, network security devices, such as network analyzers, firewalls, intrusion detection systems (IDSs), routers, gateways, proxy devices, servers etc., may monitor network activity to identify or combat malicious network activity, such as botnets, denial of service (DoS) attacks, password-based attacks, spam, spyware, malware, viruses, worms, logic bombs, hacker attacks, telecommunications fraud, or the like. Various techniques may be used by the network security devices to monitor or combat the malicious network activity, such as honeypots, device fingerprinting, authentication, authorization, and accounting (AAA) techniques, wireless device location monitoring techniques (e.g., comparing the geographic location of a wireless device to the geographic location of a transaction access point and identify malicious activity when the geographic locations do not match), or the like.

The network security devices may provide information regarding malicious network activity to the fraud management system. For example, in one implementation, a list of identifiers (e.g., network addresses, telephone numbers, usernames, etc.), associated with malicious activity, may be provided to the fraud management system. The fraud management system may use the list of identifiers to facilitate the processing of the transaction.

For example, the fraud management system may process the transaction using sets of rules, selected based on information relating to the transaction and the network security information, to generate fraud information. The fraud management system may output the fraud information to the merchant to inform the merchant whether the transaction potentially involves fraud. The fraud information may take the form of a fraud score or may take the form of an "accept" alert (meaning that the transaction is not fraudulent) or a "reject" alert (meaning that the transaction is potentially fraudulent). The merchant may then decide whether to permit or deny the transaction, or proceed to fulfill the goods or services secured in the transaction, based on the fraud information. In the description to follow, the phrase "fulfill the transaction," or the like, is intended to refer to fulfilling the goods or services secured in the transaction.

In some scenarios, the fraud management system may detect potential fraud in near real-time (i.e., while the transaction is occurring). In other scenarios, the fraud management system may detect potential fraud after conclusion of the transaction (perhaps minutes, hours, or days later). In either scenario, the fraud management system may reduce revenue loss contributable to fraud. In addition, the fraud management system may help reduce merchant costs in terms of software, hardware, and personnel dedicated to fraud detection and prevention.

Figure 2:
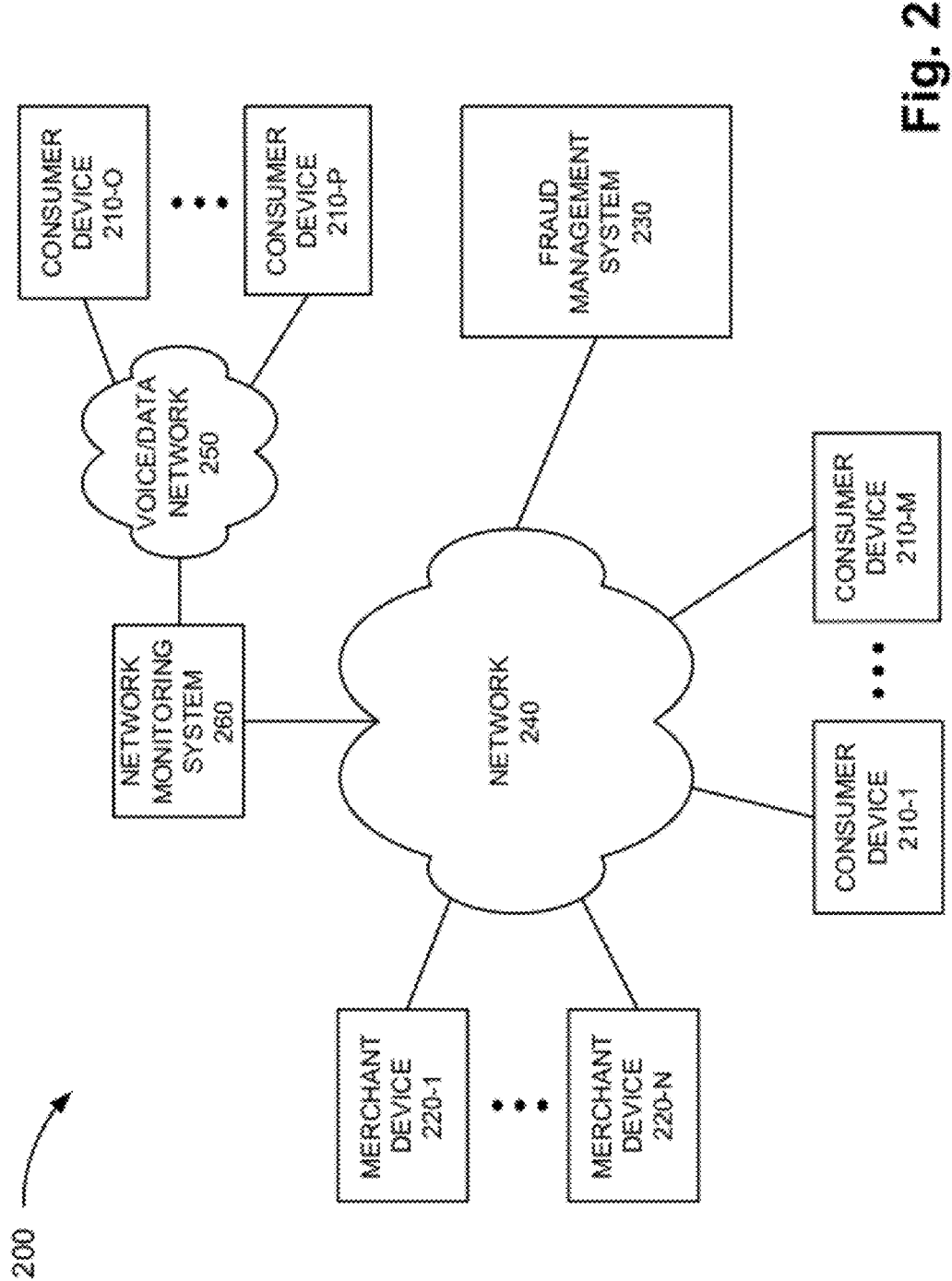
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include consumer devices 210-1, ..., 210-M (where M≥1, O≥M, and P≥O) (collectively referred to as "consumer devices 210," and individually as "consumer device 210"), merchant devices 220-1, ..., 220-N (where N≥1) (collectively referred to as "merchant devices 220," and individually as "merchant device 220"), fraud management system 230, network 240, voice/data network 250, and network monitoring system 260.

While FIG. 2 shows a particular number and arrangement of devices, in practice, environment 200 may include additional devices, fewer devices, different devices, or differently arranged devices than are shown in FIG. 2. Also, although certain connections are shown in FIG. 2, these connections are simply examples and additional or different connections may exist in practice. Each of the connections may be a wired and/or wireless connection. Further, each consumer device 210 and merchant device 220 may be implemented as multiple, possibly distributed, devices. Alternatively, a consumer device 210 and a merchant device 220 may be implemented within a single device.

Consumer device 210 may include any device capable of interacting with a merchant device 220 to perform a transaction. For example, consumer device 210 may correspond to a communication device (e.g., a mobile phone, a smartphone, a personal digital assistant (PDA), or a wireline telephone), a computer device (e.g., a laptop computer, a tablet computer, or a personal computer), a gaming device, a set top box, or another type of communication or computation device. As described herein, a user, of a consumer device 210, may use consumer device 210 to perform a transaction with regard to a merchant device 220.

Merchant device 220 may include a device, or a collection of devices, capable of interacting with a consumer device 210 to perform a transaction. For example, merchant device 220 may correspond to a computer device (e.g., a server, a laptop computer, a tablet computer, or a personal computer). Additionally, or alternatively, merchant device 220 may include a communication device (e.g., a mobile phone, a smartphone, a PDA, or a wireline telephone) or another type of communication or computation device. As described herein, merchant device 220 may interact with a consumer device 210 to perform a transaction and may interact with fraud management system 230 to determine whether that transaction is potentially fraudulent.

Fraud management system 230 may include a device, or a collection of devices, that performs fraud analysis. Fraud management system 230 may receive transaction information from merchant devices 220, receive network security information from network monitoring system 260, perform fraud analysis with regard to the transaction information and in light of the network security information, and provide, to merchant devices 220, information regarding the results of the fraud analysis.

Network 240 may include any type of network or a combination of networks. For example, network 240 may include a local area network (LAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), an optical network (e.g., a FiOS network), or a combination of networks. In one implementation, network 240 may support secure communications between merchants 220 and fraud management system 230. These secure communications may include encrypted communications, communications via a private network (e.g., a virtual private network (VPN) or a private IP VPN (PIP VPN)), other forms of secure communications, or a combination of secure types of communications.

Voice/data network 250 may include a telephone network (e.g., a PSTN, a cellular network, or a VoIP network) for voice communications and/or a data network (e.g., a LAN, WAN, MAN, or the like) for data communications. While voice/data network 250 is shown as separate from network 240, voice/data network 250 and network 240 may be the same network or have a network, or a portion of a network, in common.

Network monitoring system 260 may represent a collection of network security devices, such as network analyzers, firewalls, IDSs, routers, gateways, proxy devices, servers etc., that provides network monitoring and/or protection services. Network monitoring system 260 may collect network security information, regarding malicious network activity within voice/data network 250, and provide the network security information to fraud management system 230. The network security devices may collect network security information for purposes independent of determining whether a particular transaction is potentially fraudulent. In other words, the network security devices may collect network security information as part of their network security and/or protection functions, and independent of determining whether a particular transaction is potentially fraudulent.

In one implementation, network monitoring system 260 may create lists that may be used by fraud management system 230. The lists may include information identifying users (e.g., consumers), devices (e.g., consumer devices and/or merchant devices), and/or systems (e.g., merchant websites) that have been associated with malicious network activity. In another implementation, the network security information may include information other than lists. Network monitoring system 260 may store the network security information in one or more memory devices accessible by fraud management system 230. Alternatively, or additionally, network monitoring system 260 may transmit the network security information for storage by fraud management system 230.

Figure 3:
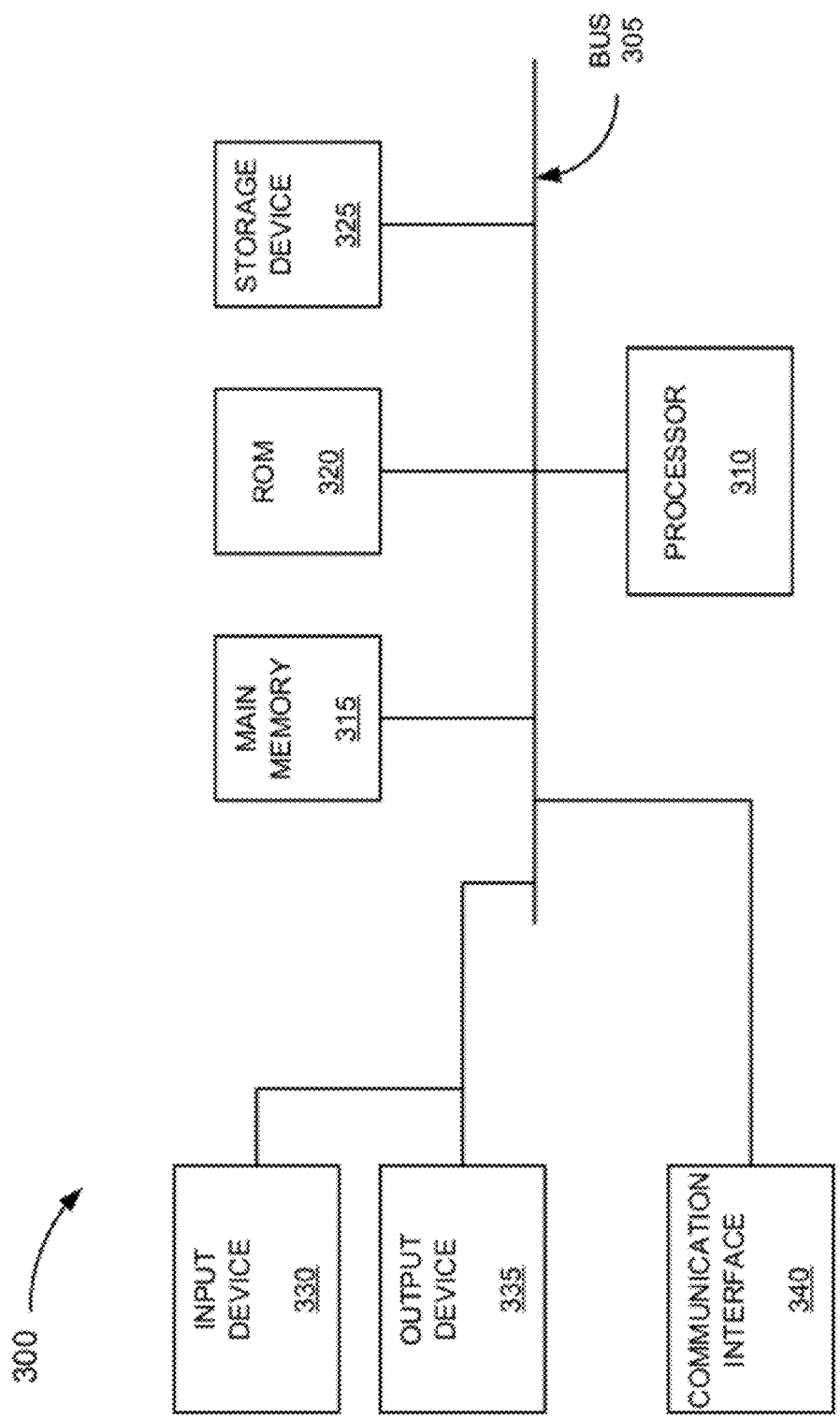
FIG. 3 is a diagram of example components of a device that may be used within the environment of FIG. 2.

FIG. 3 is a diagram of example components of a device 300. Device 300 may correspond to consumer device 210, merchant device 220, fraud management system 230, or network monitoring system 260. Each of consumer device 210, merchant device 220, fraud management system 230, and network monitoring system 260 may include one or more devices 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional components, fewer components, different components, or differently arranged components.

Bus 305 may include a path that permits communication among the components of device 300. Processor 310 may include one or more processors, one or more microprocessors, one or more application specific integrated circuits (ASICs), one or more field programmable gate arrays (FPGAs), or one or more other types of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks (e.g., network 240). In one implementation, communication interface 340 may include a wireless interface and/or a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
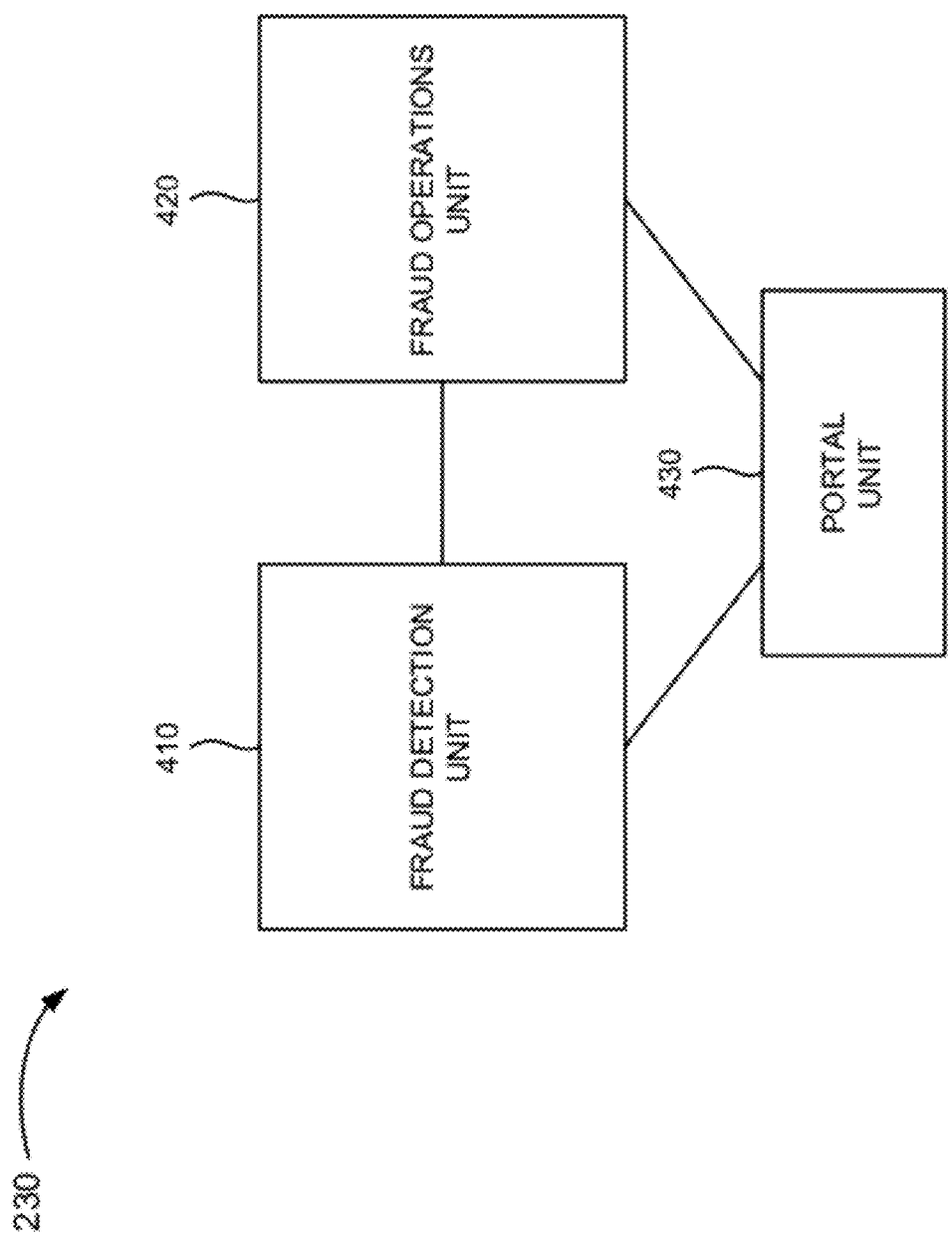
FIG. 4 is a diagram of example functional units of the fraud management system of FIG. 2.

FIG. 4 is a diagram of example functional units of fraud management system 230. In one implementation, the functions described in connection with FIG. 4 may be performed by one or more components of device 300 (FIG. 3) or one or more devices 300, unless described as being performed by a human.

As shown in FIG. 4, fraud management system 230 may include fraud detection unit 410, fraud operations unit 420, and portal unit 430. In another implementation, fraud management system 230 may include fewer functional units, additional functional units, different functional units, or differently arranged functional units. Fraud detection unit 410, fraud operations unit 420, and portal unit 430 will be described generally with regard to FIG. 4 and will be described in more detail with regard to FIGS. 5-10.

Generally, fraud detection unit 410 may receive information regarding transactions from merchant devices 220, receive network security information from network monitoring system 260, and analyze the transactions, in light of the network security information, to determine whether the transactions are potentially fraudulent. In one implementation, fraud detection unit 410 may classify a transaction as: "safe," "unsafe," or "for review." A "safe" transaction may include a transaction with a fraud score that is less than a first threshold (e.g., less than 5, less than 10, less than 20, etc. within a range of fraud scores of 0 to 100, where a fraud score of 0 may represent a 0% probability that the transaction is fraudulent and a fraud score of 100 may represent a 100% probability that the transaction is fraudulent). An "unsafe" transaction may include a transaction with a fraud score that is greater than a second threshold (e.g., greater than 90, greater than 80, greater than 95, etc. within the range of fraud scores of 0 to 100) (where the second threshold is greater than the first threshold). A "for review" transaction may include a transaction with a fraud score that is greater than a third threshold (e.g., greater than 50, greater than 40, greater than 60, etc. within the range of fraud scores of 0 to 100) and not greater than the second threshold (where the third threshold is greater than the first threshold and less than the second threshold). In one implementation, the first, second, and third thresholds and the range of potential fraud scores may be set by an operator of fraud management system 230. In another implementation, the first, second, and/or third thresholds and/or the range of potential fraud scores may be set by a merchant. In this case, the thresholds and/or range may vary from merchant-to-merchant. The fraud score may represent a probability that a transaction is fraudulent.

If fraud detection unit 410 determines that a transaction is a "safe" transaction, fraud detection unit 410 may notify a merchant device 220 that merchant device 220 may safely approve, or alternatively fulfill, the transaction. If fraud detection unit 410 determines that a transaction is an "unsafe" transaction, fraud detection unit 410 may notify a merchant device 220 to take measures to minimize the risk of fraud (e.g., deny the transaction, request additional information from a consumer device 210, require interaction with a human operator, refuse to fulfill the transaction, etc.). Alternatively, or additionally, fraud detection unit 410 may provide information regarding the unsafe transaction to fraud operations unit 420 for additional processing of the transaction. If fraud detection unit 410 determines that a transaction is a "for review" transaction, fraud detection unit 410 may provide information regarding the transaction to fraud operations unit 420 for additional processing of the transaction.

Generally, fraud operations unit 420 may receive information regarding certain transactions and may analyze these transactions to determine whether a determination can be made whether the transactions are fraudulent. In one implementation, human analyzers may use various research tools to investigate transactions and determine whether the transactions are fraudulent.

Generally, portal unit 430 may generate reports and permit merchants to request and gain access to reports relating to transactions associated with the merchants. Portal unit 430 may also function like an access port via which a merchant device 220 may gain access to information from fraud detection unit 410 and/or information from fraud operations unit 420, and/or otherwise interact with fraud detection unit 410 and/or fraud operations unit 420.

Figure 5:
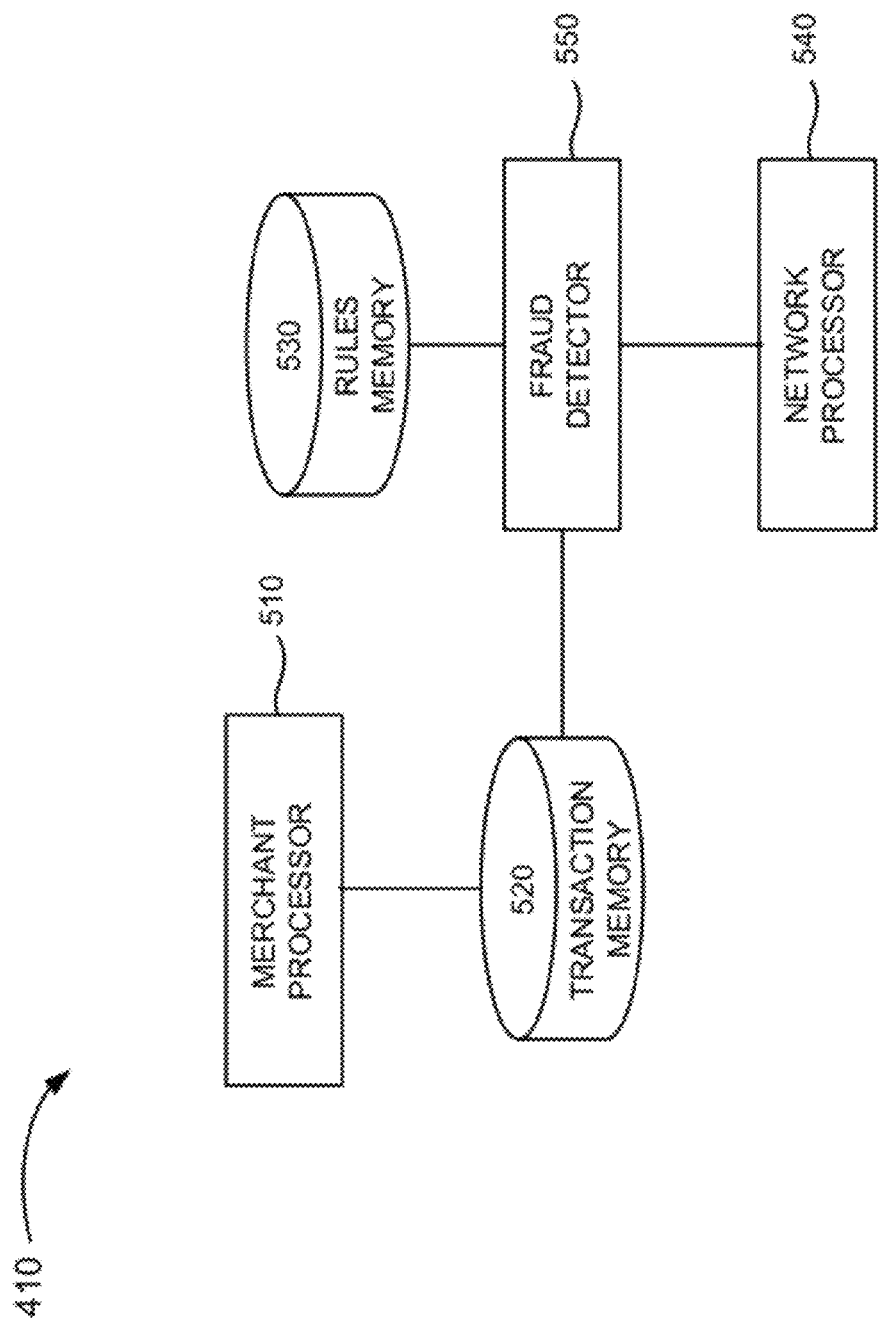
FIG. 5 is a diagram of example functional components of the fraud detection unit of FIG. 4.

FIG. 5 is a diagram of example functional components of fraud detection unit 410. In one implementation, the functions described in connection with FIG. 5 may be performed by one or more components of device 300 (FIG. 3) or one or more devices 300. As shown in FIG. 5, fraud detection unit 410 may include a merchant processor component 510, a transaction memory 520, a rules memory 530, a network processor component 540, and a fraud detector component

550. In another implementation, fraud detection unit 410 may include fewer functional components, additional functional components, different functional components, or differently arranged functional components.

Merchant processor component 510 may include a device, or a collection of devices, that may interact with merchants to assist the merchants in using fraud management system 230. For example, merchant processor component 510 may exchange encryption information, such as public/private keys or VPN information, with a merchant device 220 to permit secure future communications between fraud detection system 230 and merchant device 220.

Merchant processor component 510 may receive, from the merchant or merchant device 220, information that might be useful in detecting a fraudulent transaction. For example, merchant processor component 510 may receive a black list (e.g., a list of consumers or consumer devices 210 that are known to be associated with fraudulent activity) and/or a white list (e.g., a list of consumers or consumer devices 210 that are known to be particularly trustworthy). Additionally, or alternatively, merchant processor component 510 may receive historical records of transactions from the merchant or merchant device 220. These historical records may include information regarding transactions that were processed by a system other than fraud management system 230. Additionally, or alternatively, merchant processor component 510 may receive a set of policies from the merchant or merchant device 220. The policies may indicate thresholds for determining safe transactions, unsafe transactions, and for review transactions, may indicate a range of possible fraud scores (e.g., range of 0 to 100, range of 0 to 1000, etc.), or may indicate other business practices of the merchant. Additionally, or alternatively, merchant processor component 510 may receive a set of rules that are particular to the merchant.

Transaction memory 520 may include one or more memory devices to store information regarding present and/or past transactions. Present transactions may include transactions currently being processed by fraud detector component 550, and past transactions may include transactions previously processed by fraud detector component 550. In one implementation, transaction memory 520 may store data in the form of a database, such as a relational database or an object-oriented database. In another implementation, transaction memory 520 may store data in a non-database manner, such as tables, linked lists, or another arrangement of data.

Transaction memory 520 may store various information for any particular transaction. For example, transaction memory 520 might store: information identifying a consumer or a consumer device 210 (e.g., a consumer device ID, an IP address associated with the consumer device, a telephone number associated with the consumer device, a username associated with the consumer, a consumer ID, etc.); information identifying a merchant or a merchant device 220 (e.g., a merchant ID, merchant name, merchant device ID, etc.); information identifying an industry with which the merchant is associated (e.g., retail, medical, travel, financial, etc.); a name, telephone number, and address associated with the consumer; information regarding consumer device 210 (e.g., an IP address associated with the consumer device, a type/version of browser used by the consumer device, cookie information associated with the consumer device, a type/version of an operating system used by the consumer device, etc.); a dollar amount of the transaction; line items of the transaction (e.g., identification of each good/service purchased, each leg of an airplane flight booked, etc.); information regarding a form of payment received from the consumer (e.g., credit card information, debit card information, checking account information, paypal account information, etc.); a day and/or time that the transaction occurred (e.g., 13:15 on Nov. 5, 2010); a geographic location associated with the transaction or the consumer (e.g., a destination location associated with a form of travel, an origination location associated with a form of travel, a location of a hotel for which a room was reserved, a location of a residence of the consumer, etc.), and/or other types of information associated with the transaction, the merchant, the merchant device 220, the consumer, or the consumer device 210, and/or a past transaction associated with the merchant, the merchant device 220, the consumer, or the consumer device 210.

Transaction memory 520 may also store other information that might be useful in detecting a fraudulent transaction. For example, transaction memory 520 may store black lists and/or white lists. The black/white lists may be particular to a merchant or an industry or may be applicable across merchants or industries. The black/white lists may be received from merchants or may be generated by fraud management system 230.

Transaction memory 520 may also store historical records of transactions from a merchant. These historical records may include transactions that were processed by a system other than fraud management system 230. The historical records may include information similar to the information identified above and may also include information regarding transactions that the merchant had identified as fraudulent.

Rules memory 530 may include one or more memory devices to store information regarding rules that may be applicable to transactions. In one implementation, rules memory 530 may store rules in one or more libraries. A "library" may be a block of memory locations (contiguous or non-contiguous memory locations) that stores a set of related rules. In another implementation, rules memory 530 may store rules in another manner (e.g., as database records, tables, linked lists, etc.).

The rules may include general rules, merchant-specific rules, industry-specific rules, consumer-specific rules, transaction attribute specific rules, network security-related rules, single transaction rules, multi-transaction rules, heuristic rules, pattern recognition rules, and/or other types of rules. Some rules may be applicable to all transactions (e.g., general rules may be applicable to all transactions), while other rules may be applicable to a specific set of transactions (e.g., merchant-specific rules may be applicable to transactions associated with a particular merchant). Rules may be used to process a single transaction (meaning that the transaction may be analyzed for fraud without considering information from another transaction) or may be used to process multiple transactions (meaning that the transaction may be analyzed for fraud by considering information from another transaction). Rules may also be applicable for multiple, unaffiliated merchants (e.g., merchants having no business relationships) or multiple, unrelated consumers (e.g., consumers having no familial or other relationship).

Figure 6:
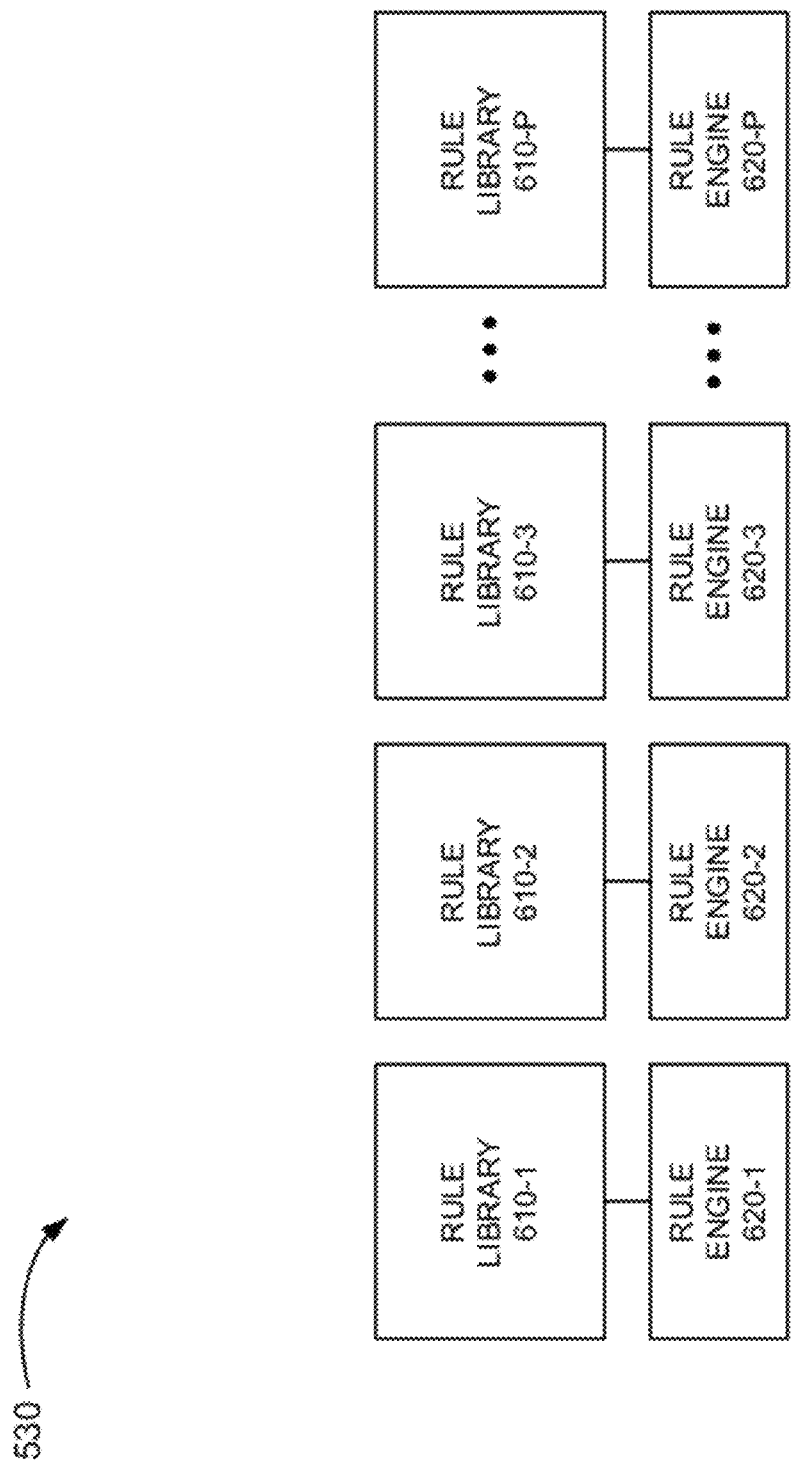
FIG. 6 is a diagram of example libraries that may be present within the rules memory of FIG. 5.

FIG. 6 is a diagram of example libraries that may be present within rules memory 530. As shown in FIG. 6, rules memory 530 may include rule libraries 610-1, 610-2, 610-3, . . . 610-P (P≥1) (collectively referred to as "libraries 610," and individually as "library 610") and rule engines 620-1, 620-2, 620-3, . . . 620-P (collectively referred to as "rule engines 620," and individually as "rule engine 620"). While FIG. 6 illustrates that rules memory 530 includes a set of rule libraries 610 and a corresponding set of rule engines 620, rules memory 530 may include fewer, additional, or different components in another implementation.

Each rule library 610 may store a set of related rules. For example, a rule library 610 may store general rules that are applicable to all transactions. Additionally, or alternatively, a rule library 610 may store rules applicable to a single transaction (meaning that the transaction may be analyzed for fraud without considering information from another transaction). Additionally, or alternatively, a rule library 610 may store rules applicable to multiple transactions (meaning that the transaction may be analyzed for fraud by considering information from another transaction (whether from the same merchant or a different merchant, whether associated with the same consumer or a different consumer)).

Additionally, or alternatively, a rule library 610 may store merchant-specific rules. Merchant-specific rules may include rules that are applicable to transactions of a particular merchant, and not applicable to transactions of other merchants. Additionally, or alternatively, a rule library 610 may store industry-specific rules. Industry-specific rules may include rules that are applicable to transactions associated with a particular industry of merchants (e.g., financial, medical, retail, travel, etc.), and not applicable to transactions associated with other industries. Additionally, or alternatively, a rule library 610 may store consumer-specific rules. Consumer-specific rules may include rules that are applicable to transactions of a particular consumer or a particular set of consumers (e.g., all consumers in the consumer's family, all consumers located at a particular geographic location, all consumers located within a particular geographic region, all consumers using a particular type of browser or operating system, etc.), and not applicable to transactions of other consumers or sets of consumers.

Additionally, or alternatively, a rule library 610 may store location-specific rules. Location-specific rules may include rules that are applicable to transactions associated with a particular geographic area (e.g., an origination location associated with a travel itinerary, a destination location associated with a travel itinerary, a location from which a transaction originated, etc.), and not applicable to transactions associated with other geographic areas. Additionally, or alternatively, a rule library 610 may store rules associated with a particular transaction attribute, such as a dollar amount or range, a name of a traveler, a telephone number, etc.

Additionally, or alternatively, a rule library 610 may store network security-related rules. Network security-related rules may include rules that are applicable to malicious network activity that has been identified by network monitoring system 260. Example network security-related rules may include: a rule related to whether an IP address associated with the transaction is on a list of network addresses that have been sources or destinations of attacks on voice/data network 250; a rule related to whether a telephone number associated with the transaction is on a list of telephone numbers that have been sources or destinations of attacks on voice/data network 250; a rule related to whether the username, corresponding to the consumer associated with the transaction, is on a list of usernames associated with malicious individuals causing malicious activity within voice/data network 250; a rule related to whether a device fingerprint, corresponding to consumer device 210 associated with the transaction, is on a list of device fingerprints associated with devices in a botnet; a rule related to whether a network address, corresponding to the merchant or merchant device 220 associated with the transaction, is on a list of network addresses that have been the victim of network attacks; or the like.

The rules in rule libraries 610 may include human-generated rules and/or automatically-generated rules. The automatically-generated rules may include heuristic rules and/or pattern recognition rules. Heuristic rules may include rules that have been generated by using statistical analysis, or the like, that involves analyzing a group of attributes (e.g., a pair of attributes or a tuple of attributes) of transactions, and learning rules associated with combinations of attributes that are indicative of fraudulent transactions. Pattern recognition rules may include rules that have been generated using machine learning, artificial intelligence, neural networks, decision trees, or the like, that analyzes patterns appearing in a set of training data, which includes information regarding transactions that have been identified as fraudulent and information regarding transactions that have been identified as non-fraudulent, and generates rules indicative of patterns associated with fraudulent transactions.

In other implementations, rule libraries 610 may store other types of rules, other combinations of rules, or differently-generated rules. Because fraud techniques are constantly changing, the rules, in rule libraries 610, may be regularly updated (either by manual or automated interaction) by modifying existing rules, adding new rules, and/or removing antiquated rules.

Each rule engine 620 may correspond to a corresponding rule library 610. A rule engine 620 may receive a transaction from fraud detector component 550, coordinate the execution of the rules by the corresponding rule library 610, and return the results (in the form of zero or more alarms) to fraud detector component 550. In one implementation, rule engine 620 may cause a transaction to be processed by a set of rules within the corresponding rule library 610 in parallel. In other words, the transaction may be concurrently processed by multiple, different rules in a rule library 610 (rather than serially processed).

Returning to FIG. 5, network processor component 540 may include a device, or a collection of devices, that obtains, manages, and/or processes network security information, which may be used to facilitate the identification of fraudulent transactions. Network processor component 540 may interact with network monitoring system 260 to obtain the network security information. In one implementation, network processor component 540 may store the network security information and perform look-ups within the stored network security information when requested by fraud detector component 550. In another implementation, network processor component 540 may store the network security information and permit fraud detector component 550 to perform its own look-ups within the stored network security information. Network processor component 540 may store the network security information in the form of a database, such as a relational database or an object-oriented database. Alternatively, network processor component 540 may store the network security information in a non-database manner, such as tables, linked lists, or another arrangement of data.

Fraud detector component 550 may include a device, or a collection of devices, that performs automatic fraud detection on transactions. Fraud detector component 550 may receive a transaction from a particular merchant device 220, obtain network security information relevant to the transaction, and select particular libraries 610 and particular rules within the selected libraries 610 applicable to the transaction. Fraud detector component 550 may then provide the transaction for processing by the selected rules in the selected libraries 610 in parallel. The output of the processing, by the selected libraries 610, may include zero or more alarms. An "alarm," as used herein, is intended to be broadly interpreted as a triggering of a rule in a library 610. A rule is triggered when the transaction satisfies the rule. For example, assume that a rule indicates a situation where a consumer reserves a hotel room in the same geographic area in which the consumer lives. A transaction would trigger (or satisfy) the rule if the transaction involved a consumer making a reservation for a hotel room in the town where the consumer lives.

Fraud detector component 550 may sort and group the alarms and analyze the groups to generate a fraud score. The fraud score may reflect the probability that the transaction is fraudulent. Fraud detector component 550 may send the fraud score, or an alert generated based on the fraud score, to a merchant device 220. The alert may simply indicate that merchant device 220 should accept, deny, or fulfill the transaction. In one implementation, the processing by fraud detector component 550 from the time that fraud detector component 550 receives the transaction to the time that fraud detector component 550 sends the alert may be within a relatively short time period, such as, for example, within thirty seconds, sixty seconds, or ten seconds. In another implementation, the processing by fraud detector component 550 from the time that fraud detector component 550 receives the transaction to the time that fraud detector component 550 sends the alert may be within a relatively longer time period, such as, for example, within minutes, hours or days.

Figure 7:
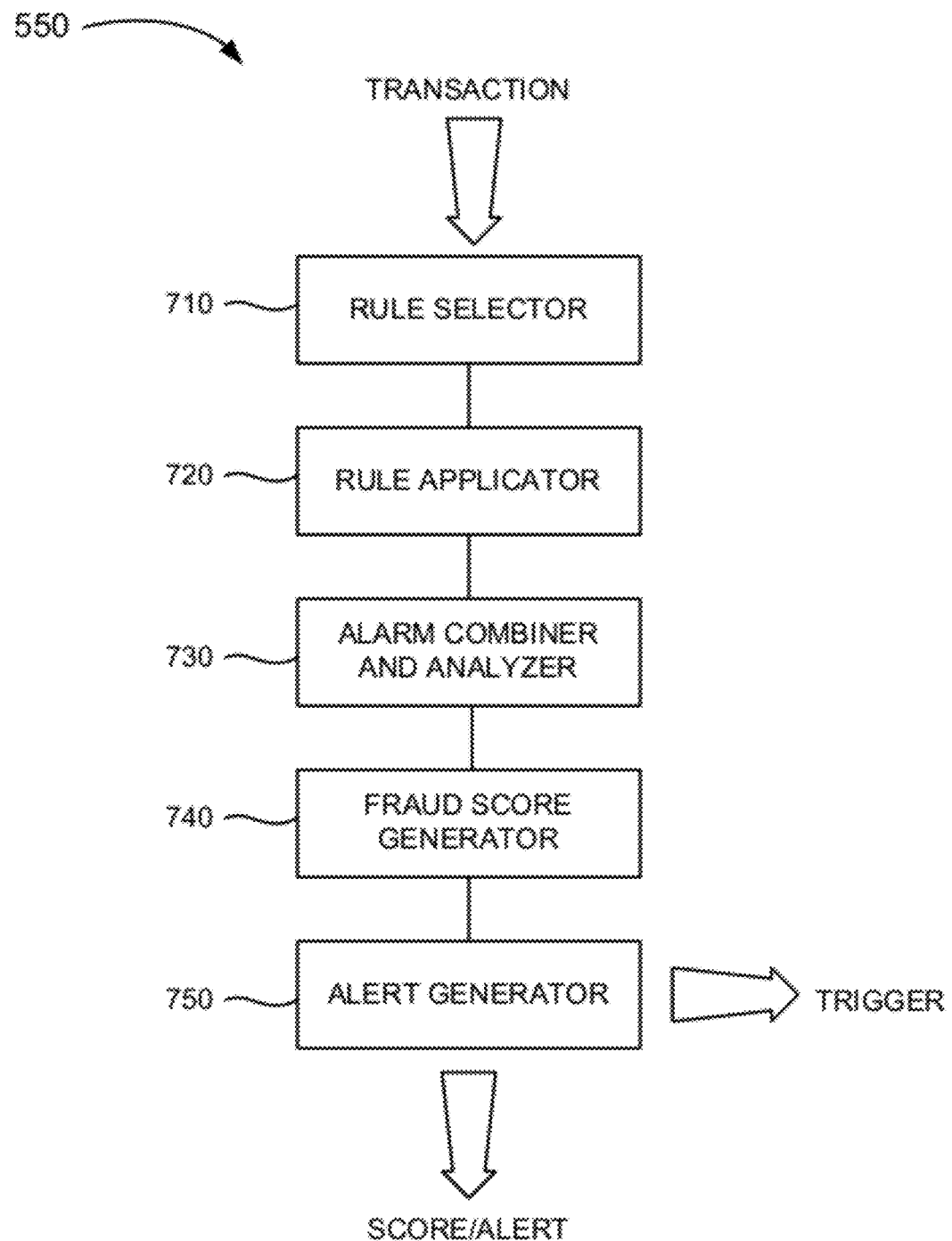
FIG. 7 is a diagram of example functional components of the fraud detector of FIG. 5.

FIG. 7 is a diagram of example functional components of fraud detector component 550. In one implementation, the functions described in connection with FIG. 7 may be performed by one or more components of device 300 (FIG. 3) or one or more devices 300. As shown in FIG. 7, fraud detector component 550 may include a rule selector component 710, a rule applicator component 720, an alarm combiner and analyzer component 730, a fraud score generator component 740, and an alert generator component 750. In another implementation, fraud detector component 550 may include fewer functional components, additional functional components, different functional components, or differently arranged functional components.

Rule selector component 710 may receive a transaction from a merchant device 220. In one implementation, the transaction may include various information, such as information identifying a consumer (e.g., name, address, telephone number, etc.); a total dollar amount of the transaction; a name of a traveler (in the case of a travel transaction); line items of the transaction (e.g., information identifying a good or service purchased or rented, origination, destination, and intermediate stops of travel, etc.); information identifying a merchant (e.g., merchant name or merchant identifier); information regarding a form of payment received from the consumer (e.g., credit card information, debit card information, checking account information, paypal account information, etc.); and information identifying a day and/or time that the transaction occurred (e.g., 13:15 on Nov. 5, 2010).

Additionally, or alternatively, rule selector component 710 may receive other information (called "meta information") from the merchant in connection with the transaction. For example, the meta information may include information identifying a consumer device 210 (e.g., a consumer device ID, an IP address associated with the consumer device, a telephone number associated with the consumer device, etc.); other information regarding consumer device 210 (e.g., an IP address associated with the consumer device, a type/version of browser used by the consumer device, cookie information associated with the consumer device, a type/version of an operating system used by the consumer device, etc.); and/or other types of information associated with the transaction, the merchant, the merchant device 220, the consumer, or the consumer device 210.

Additionally, or alternatively, rule selector component 710 may receive or obtain other information (called "third party information") regarding the transaction, the merchant, the merchant device 220, the consumer, or the consumer device 210. For example, the other information may include a geographic identifier (e.g., zip code or area code) that may correspond to the IP address associated with consumer device 210. The other information may also, or alternatively, include information identifying an industry with which the merchant is associated (e.g., retail, medical, travel, financial, etc.). Rule selector component 710 may obtain the third party information from a memory or may use research tools, such an IP address-to-geographic location identifier look up tool or a merchant name-to-industry look up tool.

Additionally, or alternatively, rule selector component 710 may receive or obtain historical information regarding the merchant, the merchant device 220, the consumer, the consumer device 210, or information included in the transaction. In one implementation, rule selector component 710 may obtain the historical information from transaction memory 520 (FIG. 5).

Additionally, or alternatively, rule selector component 710 may receive or obtain network security information relating to the merchant, the merchant device 220, the consumer, the consumer device 210, or information included in the transaction. In one implementation, rule selector component 710 may obtain the network security information from network processor component 540 (FIG. 5).

The transaction information, the meta information, the third party information, the historical information, and/or the network security information may be individually referred to as a "transaction attribute" or an "attribute of the transaction," and collectively referred to as "transaction attributes" or "attributes of the transaction."

Rule selector component 710 may generate a profile for the transaction based on the transaction attributes. Based on the transaction profile and perhaps relevant information in a white or black list (i.e., information, relevant to the transaction, that is present in a white or black list), rule selector component 710 may select a set of libraries 610 within rules memory 530 and/or may select a set of rules within one or more of the selected libraries 610. For example, rule selector component 710 may select libraries 610, corresponding to general rules, single transaction rules, multi-transaction rules, merchant-specific rules, industry-specific rules, etc., for the transaction.

Rule applicator component 720 may cause the transaction to be processed using rules of the selected libraries 610. For example, rule applicator component 720 may provide information regarding the transaction to rule engines 620 corresponding to the selected libraries 610. Each rule engine 620 may process the transaction in parallel and may process the transaction using all or a subset of the rules in the corresponding library 610. The transaction may be concurrently processed by different sets of rules (of the selected libraries 610 and/or within each of the selected libraries 610). The output, of each of the selected libraries 610, may include zero or more alarms. As explained above, an alarm may be generated when a particular rule is triggered (or satisfied).

Alarm combiner and analyzer component 730 may aggregate and correlate the alarms. For example, alarm combiner and analyzer component 730 may analyze attributes of the transaction(s) with which the alarms are associated (e.g., attributes relating to a form of payment, an IP address, a travel destination, etc.). Alarm combiner and analyzer component 730 may sort the alarms, along with alarms of other transactions (past or present), into groups (called "cases") based on values of one or more of the attributes of the transactions associated with the alarms (e.g., credit card numbers, IP addresses, geographic locations, consumer names, etc.). The transactions, included in a case, may involve one merchant or multiple, unaffiliated merchants and/or one consumer or multiple, unrelated consumers.

Alarm combiner and analyzer component 730 may separate alarms (for all transactions, transactions sharing a common transaction attribute, or a set of transactions within a particular window of time) into one or more cases based on transaction attributes. For example, alarm combiner and analyzer component 730 may place alarms associated with a particular credit card number into a first case, alarms associated with another particular credit card number into a second case, alarms associated with a particular IP address into a third case, alarms associated with a consumer or consumer device 210 into a fourth case, alarms associated with a particular merchant into a fifth case, alarms associated with a particular geographic location into a sixth case, etc. A particular alarm may be included in multiple cases.

Figure 8:
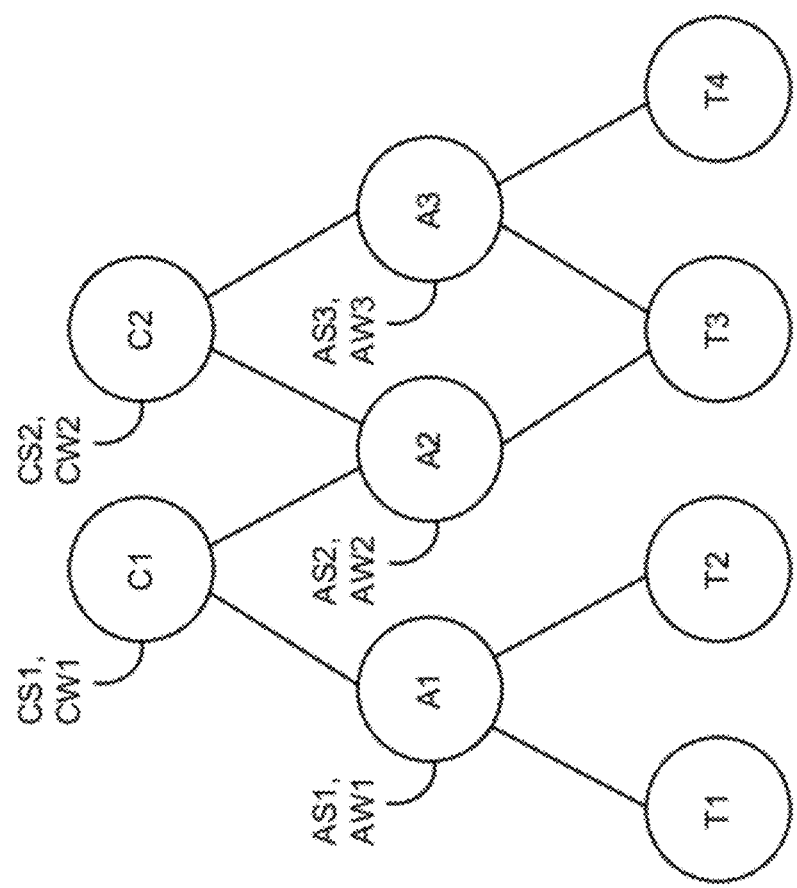
FIG. 8 is a diagram of example cases into which alarms may be placed by the alarm combiner and analyzer component of FIG. 7.

FIG. 8 is a diagram of example cases into which alarms may be placed by alarm combiner and analyzer component 730. As shown in FIG. 8, assume that fraud detector component 550 receives four transactions T1-T4. By processing each of transactions T1-T4 using rules in select libraries 610, zero or more alarms may be generated. As shown in FIG. 8, assume that three alarms A1-A3 are generated. An alarm may be an aggregation of one or more transactions (e.g., alarm A1 is the aggregation of transactions T1 and T2; alarm A2 is the aggregation of transaction T3; and alarm A3 is the aggregation of transactions T3 and T4) that share a common attribute. The alarms may be correlated into cases. As shown in FIG. 8, assume that two cases C1 and C2 are formed. A case is a correlation of one or more alarms (e.g., case C1 is the correlation of alarms A1 and A2; and case C2 is the correlation of alarms A2 and A3) that share a common attribute.

An individual alarm may not be sufficient evidence to determine that a transaction is fraudulent. When the alarm is correlated with other alarms in a case, then a clearer picture of whether the transaction is fraudulent may be obtained. Further, when multiple cases involving different attributes of the same transaction are analyzed, then a decision may be made whether a transaction is potentially fraudulent.

Returning to FIG. 7, fraud score generator component 740 may generate a fraud score. Fraud score generator component 740 may generate a fraud score from information associated with one or more cases (each of which may include one or more transactions and one or more alarms). In one implementation, fraud score generator component 740 may generate an alarm score for each generated alarm. For example, each of the transaction attributes and/or each of the rules may have a respective associated weight value. Thus, when a particular transaction attribute causes a rule to trigger, the generated alarm may have a particular score based on the weight value of the particular transaction attribute and/or the weight value of the rule. When a rule involves multiple transactions, the generated alarm may have a particular score that is based on a combination of the weight values of the particular transaction attributes.

In one implementation, fraud score generator component 740 may generate a case score for a case by combining the alarm scores in some manner. For example, fraud score generator component 740 may generate a case score (CS) by using a log-based Naïve Bayesian algorithm, such as:

$$CS = \frac{\sum_i \frac{AS_i \times AW_i}{AM_i}}{\sum_i AW_i} \times 1000,$$

where CS may refer to the score for a case, $AS_i$ may refer to an alarm score for a given value within an alarm i, $AW_i$ may refer to a relative weight given to alarm i, and $AM_i$ may refer to a maximum score value for alarm i. The following equation may be used to calculate $AS_i$ when the score for the alarm involves a list (e.g., more than one alarm in the case):

$$AS_i = 1 - (1 - s_1) \times (1 - s_2) \times (1 - s_n).$$

Alternatively, fraud score generator component 740 may generate a case score using an equation, such as:

$$CS = \sum_{k=1}^{m} AS_k, \text{ or}$$

$$CS = \sum_{k=1}^{m} AS_k \times AW_k$$

(as shown in FIG. 8, alarm A1 has an alarm score AS1 and a weight value AW1, alarm A2 has an alarm score AS2 and a weight value AW2, and alarm A3 has an alarm score AS3 and a weight value AW3).

Fraud score generator component 740 may generate a fraud score for a transaction by combining the case scores in some manner. For example, fraud score generator component 740 may generate the fraud score (FS) using an equation, such as:

$$FS = \sum_{k=1}^{n} CS_k.$$

In another implementation, each case may have an associated weight value (as shown in FIG. 8, case C1 has a case score CS1 and a weight value CW1, and case C2 has a case score CS2 and a weight value CW2). In this situation, fraud score generator component 740 may generate the fraud score using an equation, such as:

$$FS = \sum_{k=1}^{n} CS_k \times CW_k,$$

where CW may refer to a weight value for a case.

Alert generator component 750 may generate an alert and/or a trigger based, for example, on the fraud score. In one implementation, alert generator component 750 may classify the transaction, based on the fraud score, into: safe, unsafe, or for review. As described above, fraud detection unit 410 may store policies for a particular merchant that indicate, among other things, the thresholds that are to be used to classify a transaction as safe, unsafe, or for review. When the transaction is classified as safe or unsafe, alert generator component 750 may generate and send the fraud score and/or an alert (e.g., safe/unsafe or accept/deny) to the merchant so that the merchant can make an intelligent decision as to whether to accept, deny, or fulfill the transaction. When the transaction is classified as for review, alert generator component 750 may generate and send a trigger to fraud operations unit 420 so that fraud operations unit 420 may perform further analysis regarding a transaction or a set of transactions associated with a case.

Figure 9:
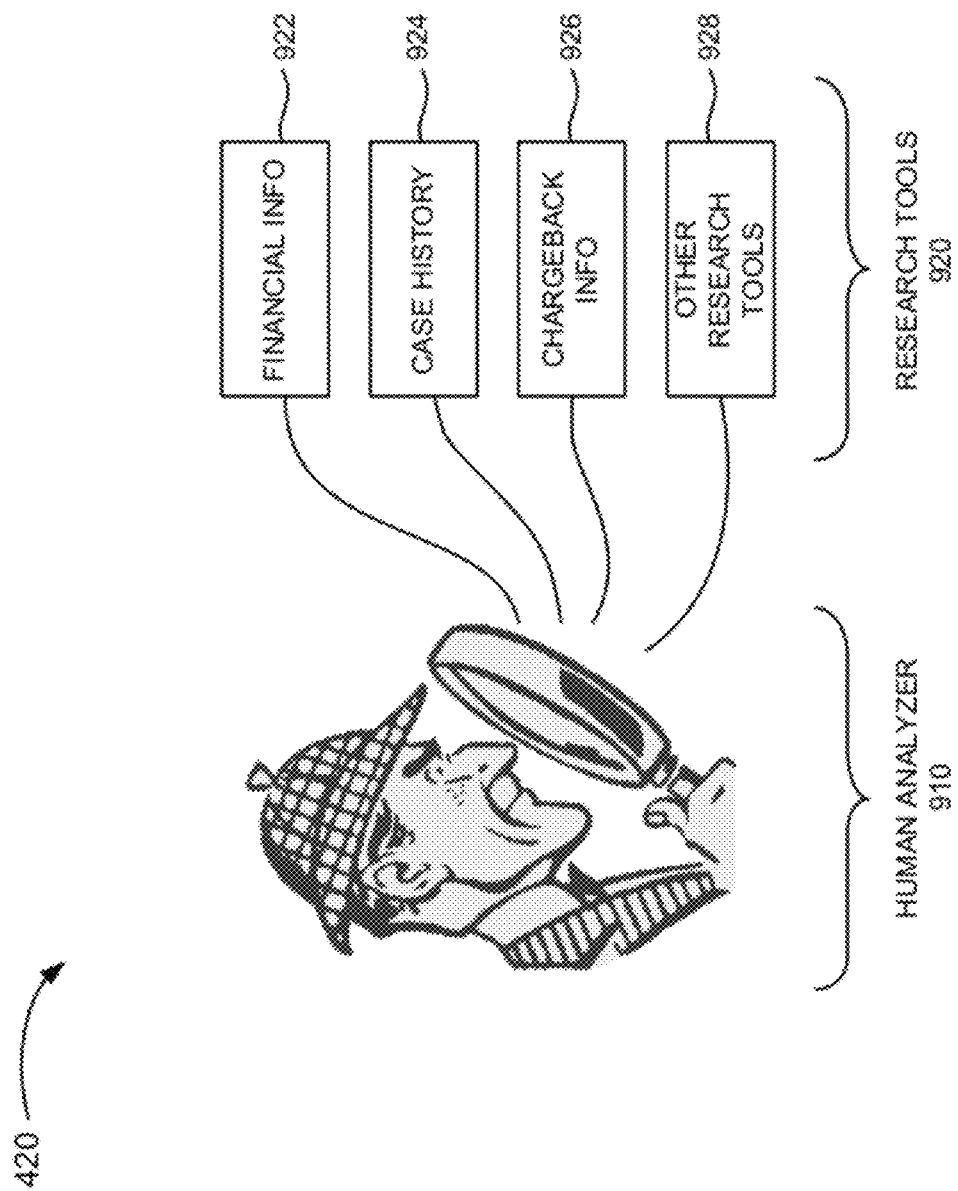
FIG. 9 is a diagram of example functional components of the fraud operations unit of FIG. 4.

FIG. 9 is a diagram of example functional components of fraud operations unit 420. In one implementation, the functions described in connection with FIG. 9 may be performed by one or more components of device 300 (FIG. 3) or one or more devices 300, unless described as being performed by a human. As shown in FIG. 9, fraud operations unit 420 may include a human analyzer 910 and a set of research tools 920. In another implementation, fraud operations unit 420 may include fewer, additional, or different functional components.

Human analyzer 910 may include a person, or a set of people, trained to research and detect fraudulent transactions. Human analyzer 910 may analyze for review transactions (e.g., transactions included in consolidated cases) and perform research to determine whether the transactions are fraudulent. Additionally, or alternatively, human analyzer 910 may perform trending analysis, perform feedback analysis, modify existing rules, and/or create new rules. Human analyzer 910 may record the results of transaction analysis and may present the results to fraud detection unit 410 and/or one or more merchant devices 220. Human analyzer 910 may cause modified rules and/or new rules to be stored in appropriate libraries 610.

Research tools 920 may include financial information 922, case history 924, chargeback information 926, and other research tools 928. Financial information 922 may include financial data and tools. Case history 924 may include a repository of previously analyzed cases. In one implementation, case history 924 may store a repository of cases for some period of time, such as six months, a year, two years, five years, etc. Chargeback information 926 may include information regarding requests for reimbursements (commonly referred to as "chargebacks") from a financial institution when the financial institution identifies a fraudulent transaction. When the financial institution identifies a fraudulent transaction, the financial institution may contact the merchant that was involved in the transaction and indicate, to the merchant, that the merchant's account is going to be debited for the amount of the transaction and perhaps have to pay a penalty fee. Other research tools 928 may include reverse telephone number look up tools, address look up tools, white pages tools, Internet research tools, etc. which may facilitate the determination of whether a transaction is fraudulent.

Figure 10:
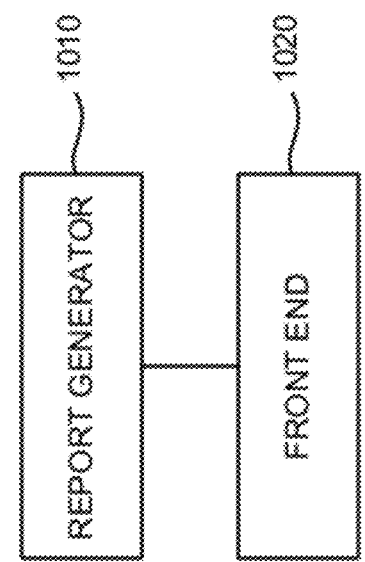
FIG. 10 is a diagram of example functional components of the portal unit of FIG. 4.

FIG. 10 is a diagram of example functional components of portal unit 430. In one implementation, the functions described in connection with FIG. 10 may be performed by one or more components of device 300 (FIG. 3) or one or more devices 300. As shown in FIG. 10, portal unit 430 may include a report generator component 1010 and a front end component 1020. In another implementation, portal unit 430 may include fewer functional components, additional functional components, different functional components, or differently arranged functional components.

Report generator component 1010 may generate reports for merchants. For example, a merchant may request (e.g., via front end component 1020) a particular report relating to transactions that the merchant sent to fraud management system 230. The report may provide information regarding the analysis of various transactions and may be tailored, by the merchant, to include information that the merchant desires. Report generator component 1010 may be configured to generate reports periodically, only when prompted, or at any other interval specified by a merchant. Report generator component 1010 may automatically send reports to merchants or may make the reports available to the merchants via front end component 1020.

In one implementation, report generator component 1010 may segregate information prior to generating a report. As explained above, a case may include information regarding transactions of multiple, unaffiliated merchants. For business reasons, when generating a report for a particular merchant, report generator component 1010 may remove information regarding transactions from other merchants ("other transactions"), including, for example, the influence that the other transactions had in generating fraud scores and in triggering particular rules. Report generator component 1010 may adjust scores (alarm, case, and/or fraud scores) to remove the effects from the other transactions.

Front end component 1020 may present a user interface accessible to merchants. Via front end component 1020, merchants may request reports, access previously-generated reports, interact with a human analyzer, or interact with fraud detection unit 410 and/or fraud operations unit 420 in another manner. In one implementation, front end component 1020 may automatically send generated reports to merchants (e.g., via email, facsimile, etc.) or may store generated reports in a memory to await retrieval by the merchants.

Figure 11:
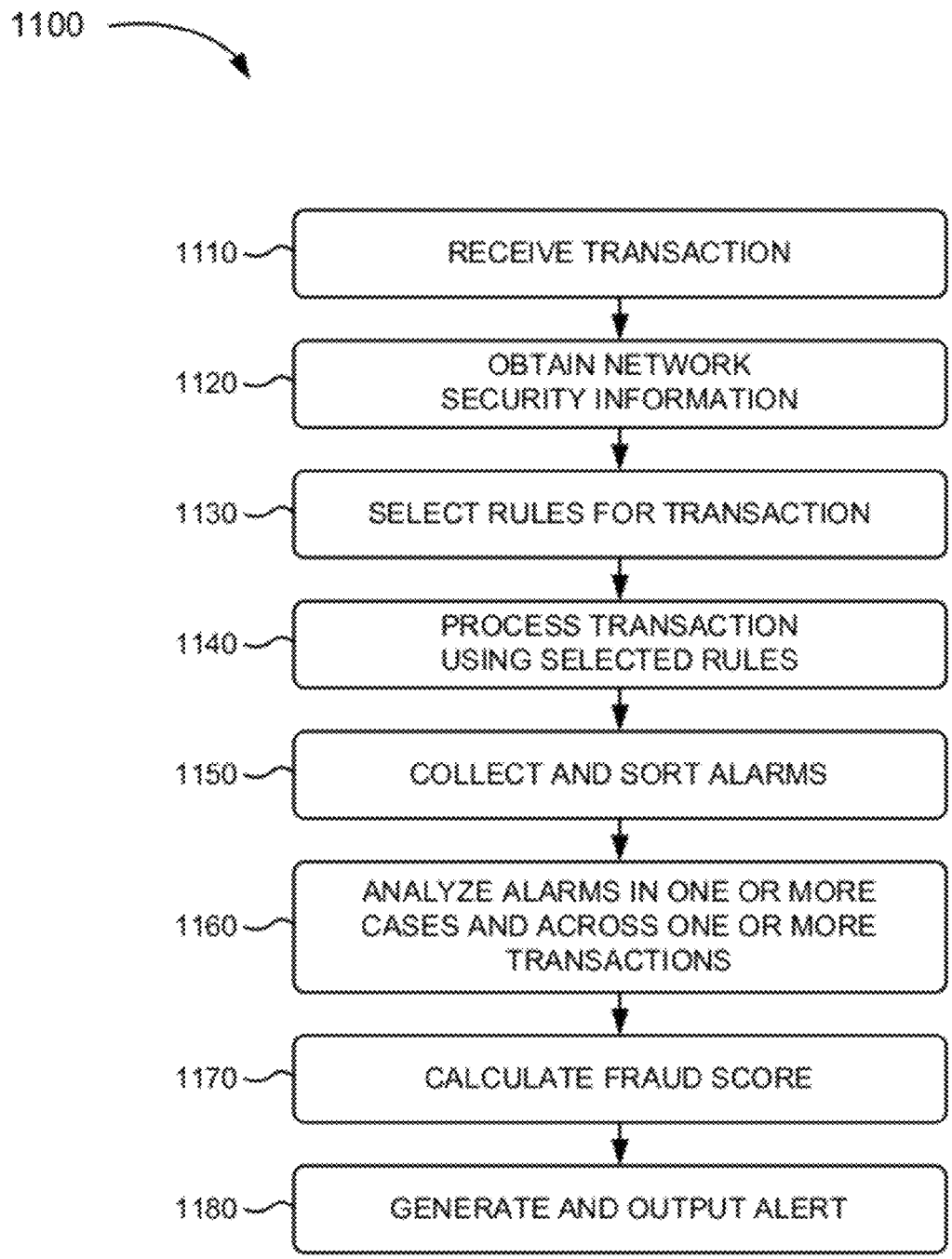
FIG. 11 is a flowchart of an example process for analyzing instances of fraud.

FIG. 11 is a flowchart of an example process 1100 for analyzing instances of fraud. In one implementation, process 1100 may be performed by one or more components/devices of fraud management system 230. In another implementation, one or more blocks of process 1100 may be performed by one or more other components/devices, or a group of components/devices including or excluding fraud management system 230.

Process 1100 may include receiving a transaction (block 1110). For example, fraud detector component 550 may receive, from a merchant device 220, a transaction involving a merchant and a consumer. Merchant device 220 may use secure communications, such as encryption or a VPN, to send the transaction to fraud management system 230. In one implementation, merchant device 220 may send the transaction to fraud management system 230 in near real time (e.g., when a consumer submits money to the merchant for the transaction) and perhaps prior to the money being accepted by the merchant. In another implementation, merchant device 220 may send the transaction to fraud management system 230 after the money, for the transaction, has been accepted by the merchant (e.g., after the money has been accepted but prior to a product or service, associated with the transaction, being fulfilled, or possibly after the money has been accepted and after the product or service, associated with the transaction, has been fulfilled). In practice, fraud management system 230 may simultaneously receive information regarding multiple transactions from one or more merchant devices 220.

Network security information may be obtained (block 1120). For example, fraud detector component 550 may obtain network security information that is associated with the consumer or the merchant. The network security information may indicate, for example, that the consumer is associated with malicious activity within voice/data network 250; that a consumer device 210, associated with the consumer, is associated with malicious activity within voice/data network 250; that merchant device 220 has been the victim of malicious activity within voice/data network 250; that a website, of the merchant, has been the victim of malicious activity within voice/data network 250; etc. As explained above, the network security information may be collected by network security devices for purposes independent of the transaction between the merchant and the consumer. In other words, the network security devices may collect network security information for purposes of protecting voice/data network 250, devices within voice/data network 250, or end user devices connected to voice/data network 250 from attack, and not for purposes of determining whether a particular transaction is potentially fraudulent.

In one implementation, to obtain the network security information, fraud detector component 550 may perform a look-up operation, within a memory, based on information regarding the consumer, the consumer device 210, the merchant device 220, or the merchant. In another implementation, fraud detector component 550 may send a request to network processor component 540 for the network security information. The request may include, for example, information regarding the consumer, the consumer device 210, the merchant device 220, or the merchant. Fraud detector component 550 may receive the network security information, from network processor component 540, in response to the request.

Rules may be selected for the transaction (block 1130). For example, fraud detector component 550 may generate a profile for the transaction based on transaction attributes (e.g., information in the transaction itself, meta information associated with the transaction, third party information associated with the transaction, historical information associated with the transaction, and/or network security information relevant to the transaction). Fraud detector component 550 may use the profile and relevant information in a black or white list (if any information, relevant to the transaction, exists in a black or white list) to select a set of libraries 610 and/or a set of rules within one or more libraries 610 in the selected set of libraries 610. For example, fraud detector component 550 may select libraries 610 having single transaction rules, multi-transaction rules, merchant-specific rules, industry-specific rules, consumer-specific rules, network security-related rules, or the like, based on information in the profile and/or information (if any) in a black or white list. As described above, some rules may be selected for every transaction.

The transaction may be processed using the selected rules (block 1140). For example, fraud detector component 550 may provide the transaction to rule engines 620 corresponding to the selected set of libraries 610 for processing. In one implementation, fraud detector component 550 may provide the transaction for processing by multiple rule engines 620 in parallel. The transaction may also be processed using two or more of the rules, in the selected set of rules of a library 610, in parallel. By processing the transaction using select rules, the accuracy of the results may be improved over processing the transaction using all of the rules (including rules that are irrelevant to the transaction). When a rule triggers (is satisfied), an alarm may be generated. The output of processing the transaction using the selected rules may include zero or more alarms.

The alarms may be collected and sorted (block 1150). For example, fraud detector component 550 may aggregate the alarms and may analyze attributes of the transactions with which the alarms are associated (e.g., attributes relating to a particular form of payment, a particular geographic area, a particular consumer, etc.). Fraud detector component 550 may correlate the alarms, along with alarms of other transactions (past or present associated with the same or different (unaffiliated) merchants), into cases based on values of the attributes of the transactions associated with alarms. For example, fraud detector component 550 may include one or more alarms associated with a particular credit card number in a first case, one or more alarms associated with a particular travel destination in a second case, one or more alarms associated with a particular country in a third case, etc. As described above, a particular alarm may be included in multiple cases.

The alarms, in one or more cases, may be analyzed across one or more transactions (block 1160). For example, fraud detector component 550 may analyze the alarms in a case (where the alarms may be associated with multiple transactions possibly from multiple, unaffiliated merchants and/or possibly from multiple, different industries) to determine whether the alarms justify a determination that the transaction is potentially fraudulent. By analyzing alarms in multiple cases, fraud detector component 550 may get a good picture of whether fraudulent activity is occurring.

A fraud score may be generated (block 1170). For example, fraud detector component 550 may generate a case score for each of the cases using a technique, such as a technique described previously. Fraud detector component 550 may combine the case scores, associated with the transaction, to generate a fraud score for the transaction. In one implementation, as described above, the case scores, associated with the different cases, may be weighted differently. For example, the fraud score of case 1 may have an associated weight of CW1, the fraud score of case 2 may have an associated weight of CW2, the fraud score of case 3 may have an associated weight of CW3, etc. Thus, in this implementation, the different case scores may not contribute equally to the fraud score. The fraud score may reflect a probability that the transaction is fraudulent.

In one implementation, the fraud score may include a value in the range of 0 to 100, where "0" may reflect a 0% probability that the transaction is fraudulent and "100" may reflect a 100% probability that the transaction is fraudulent. It may be possible for the case score of a particularly important case (with a high weight value) to drive the fraud score to 100 (even without any contribution from any other cases).

An alert may be generated and outputted (block 1180). For example, fraud detector component 550 may generate an alert based on the fraud score and policies associated with the merchant. For example, the merchant may specify policies that indicate what fraud scores constitute a safe transaction, what fraud scores constitute an unsafe transaction, and what fraud scores constitute a for review transaction. Fraud detector component 550 may generate an alert that indicates, to the merchant, that the transaction should be permitted or that the transaction should be denied.

Fraud detector component 550 may send the alert and/or the fraud score to the merchant so that the merchant can process the transaction accordingly. In one implementation, fraud detector component 550 may send the alert and/or fraud score while the merchant is still processing the transaction (e.g., before the merchant has approved the transaction). In another implementation, fraud detector component 550 may send the alert and/or fraud score after the merchant has completed processing the transaction (e.g., after the merchant has approved the transaction). In the latter implementation, when the transaction is determined to be potentially fraudulent, the merchant may take measures to minimize its loss (e.g., by canceling the airline tickets, by canceling shipping of the ordered product, by canceling performance of the ordered service, by canceling the payment of a medical claim, etc.).

Figure 12:
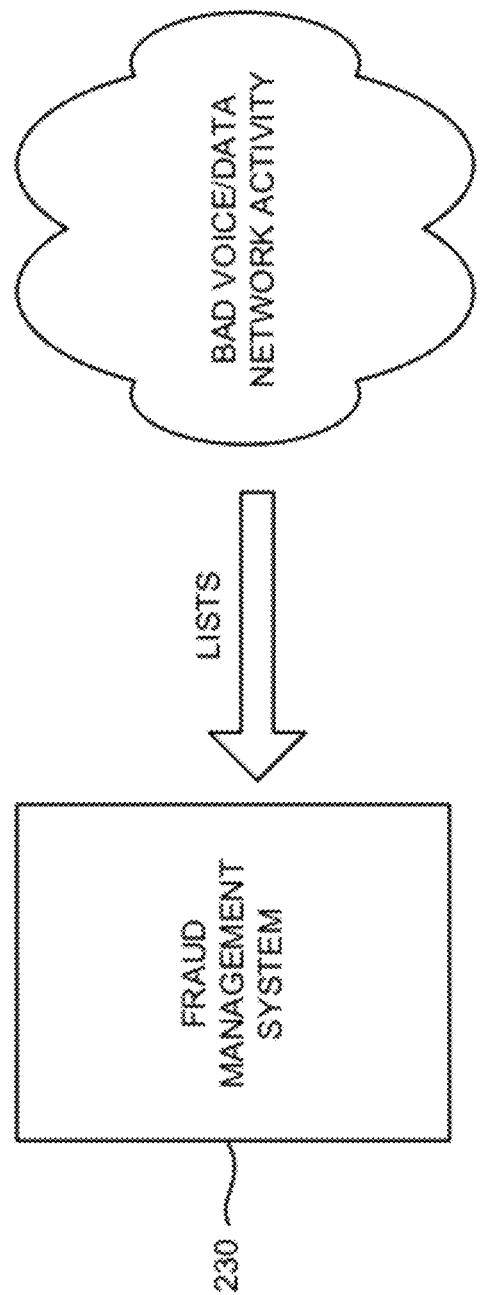

FIGS. 12 and 13 are diagrams illustrating an example for identifying a fraudulent transaction. As shown in FIG. 12, information regarding malicious voice/data network activity may be collected and provided to fraud management system 230. For example, network security devices, associated with a voice network (e.g., a PSTN or a wireless telephone network) and/or a data network (e.g., a WAN, such as the Internet), may monitor network activity to identify and combat malicious activity (e.g., spam, viruses, worms, DoS attacks, botnets, password-based attacks, telecommunications fraud, etc.). The network security devices may use various techniques (e.g., honeypots, device fingerprinting, wireless device location monitoring, AAA, etc.) to identify devices that are sources of the malicious activity, devices that are the victims of the malicious activity, users that are causing the malicious activity, and/or merchants that are the victims of the malicious activity.

The network security devices, or a device operating on their behalf, may create lists for use by fraud management system 230. The lists may include a list of user identifiers (e.g., usernames, names, addresses, etc.) associated with users that have been identified as causing malicious activity; a list of device identifiers (e.g., network addresses, telephone numbers, device fingerprints, etc.) associated with devices that are sources or victims of malicious activity; and/or a list of system identifiers (e.g., uniform resource locators (URLs), universal resource identifiers (URIs), etc.) associated with websites of merchants that are victims of malicious activity. The lists may be provided to fraud management system 230, as shown in FIG. 12.

As shown in FIG. 13, assume that a first consumer and a second consumer use the same credit card number on the FlyToday.com website to purchase two trips associated with a same traveler. For example, assume that, on October 1st, the first consumer purchases a trip, for a particular individual, that leaves Phoenix on November 1st for Mexico City and returns to Phoenix on November 10th; and assume that, also on October 1st, the second consumer purchases a trip, for the same, particular individual, that leaves Miami on November 8th for Rio de Janeiro and returns to Miami on November 16th. Assume further that both the first consumer and the second consumer interact with the FlyToday.com website using the same IP address, and that IP address is included in network security information as a source of malicious activity.

The transactions, associated with these trips, may be processed by fraud management system 230. For example, fraud management system 230 may receive the first consumer's transaction, obtain network security information relevant to the transaction, select rules for the transaction, such as travel industry rules, FlyToday.com-specific rules, credit card rules, Mexico City rules, network security-related rules, single transaction rules, multi-transaction rules, etc., and process the transaction using the selected rules. Assume that a set of the selected rules trigger and generate corresponding alarms. For example, one rule may generate an alarm because the travel is destined for the hot destination of Mexico City (a hot destination may refer to a destination known to be associated with fraudulent activity); and another rule may generate an alarm because the IP address, used by the first consumer, is included in a list of potentially malicious IP addresses.

Fraud management system 230 may process the alarms and determine, for example, that the transaction is potentially fraudulent based on the information known to fraud management system 230 at the time of processing the first consumer's transaction. Fraud management system 230 may notify FlyToday.com that the transaction is potentially fraudulent. In other words, based on the totality of information available to fraud management system 230 at the time of processing the first consumer's transaction, fraud management system 230 may determine that the first consumer's transaction is potentially fraudulent and may notify FlyToday.com to deny, or not fulfill, the transaction.

Fraud management system 230 may receive the second consumer's transaction, obtain network security information relevant to the transaction, select rules for the transaction, such as travel industry rules, FlyToday.com-specific rules, credit card rules, Rio de Janeiro rules, Miami rules, network security-related rules, single transaction rules, multi-transaction rules, etc., and process the transaction using the selected rules. Assume that a set of the selected rules trigger and generate corresponding alarms. For example, one rule may generate an alarm because the travel is destined for the hot destination of Rio de Janeiro; another rule may generate an alarm because the travel originated in the hot location of Miami; another rule may generate an alarm because the IP address, used by the second consumer, matches the IP address used by the first consumer; another rule may generate an alarm because overlapping travel has been booked for the same traveler (e.g., two trips that overlap in time); and another rule may generate an alarm because the IP address, used by the second consumer, is included in a list of potentially malicious IP addresses.

Fraud management system 230 may process the alarms and determine, for example, that the transaction is potentially fraudulent based on the information known to fraud management system 230 at the time of processing the second consumer's transaction. In other words, based on the totality of information available to fraud management system 230 at the time of processing the second consumer's transaction, fraud management system 230 may determine that the second consumer's transaction is potentially fraudulent and may notify FlyToday.com to deny, or not fulfill, the transaction.

An implementation, described herein, may determine potentially fraudulent transactions using network security information gathered by monitoring and/or combating malicious activity in a voice network and/or a data network, where the network security information is gathered independent of interactions, between consumers and merchants, that result in the transactions. The network security information may provide valuable information to supplement the processing of transactions between merchants and consumers.

The foregoing description provides illustration and description, but is not intended to be exhaustive or to limit the invention to the precise form disclosed. Modifications and variations are possible in light of the above disclosure or may be acquired from practice of the invention.

For example, while a series of blocks has been described with regard to FIG. 11, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by one or more computer devices, a plurality of rules for detecting fraud;
   receiving, by the one or more computer devices, information associated with a transaction involving a consumer and a merchant;
   obtaining, by the one or more computer devices, network security information that indicates malicious network activity, associated with the consumer or the merchant, in a voice network or a data network;
   determining, by the one or more computer devices, an industry of the merchant based on the information associated with the transaction;
   selecting, by the one or more computer devices, one or more rules, from the plurality of rules, based on the industry and the network security information;
   using, by the one or more computer devices, the one or more rules to generate one or more alarms;
   correlating, by the one or more computer devices, at least one alarm, of the one or more alarms, and one or more other alarms into a case;
   calculating, by the one or more computer devices, a fraud score for the transaction based on correlating the at least one alarm and the one or more other alarms into the case; and
   outputting, by the one or more computer devices, information regarding the fraud score to the merchant to assist the merchant in determining whether to accept, deny, or fulfill the transaction.

2. The method of claim 1, where selecting the one or more rules includes:
   generating a profile associated with the transaction based on the industry, the network security information, and one or more of:
      information identifying the consumer,
      a dollar amount associated with the transaction,
      a geographic location associated with the transaction,
      information identifying a good or a service purchased or rented by the consumer,
      information identifying a device of the consumer,
      a type of browser used by the device of the consumer, or historical information associated with previous transactions associated with the merchant, the consumer, or the device of the consumer; and
   selecting the one or more rules, from the plurality of rules, based on the profile.

3. The method of claim 1, where outputting the information regarding the fraud score includes:
   determining policies associated with the merchant,
   generating an alert, associated with the transaction, based on the fraud score and the policies,
      the alert indicating that the merchant should accept, deny, or fulfill the transaction, and
   outputting the alert to the merchant.

4. The method of claim 1, where the network security information comprises information identifying that the consumer, a device associated with the consumer, a device associated with the merchant, or a website associated with the merchant is associated with the malicious network activity in the voice network or the data network.

5. The method of claim 1, where the plurality of rules include at least two of:
   industry-specific rules applicable to transactions associated with the industry of the merchant;
   consumer-specific rules applicable to transactions associated with the consumer; or
   network security rules applicable to the malicious network activity.

6. The method of claim 1, where calculating the fraud score includes:
   correlating at least one other alarm into another case based on attributes of another transaction, and
   generating the fraud score based on a first case score of the case and a second case score of the other case.

7. The method of claim 1,
   where correlating the at least one alarm and the one or more other alarms into the case includes:
      aggregating particular alarms corresponding to transactions associated with a plurality of merchants associated with a plurality of different industries,
         the particular alarms including the at least one alarm and the one or more other alarms,
         the transactions including the transaction,
         the plurality of merchants including the merchant, and
         the plurality of different industries including the industry, and
      correlating the particular alarms into a plurality of cases,
         the plurality of cases including the case, and
   where calculating the fraud score includes:
      generating case scores for the plurality of cases, and
      calculating the fraud score based on the case scores.

8. The method of claim 1, further comprising:
   determining whether the fraud score is less than a first threshold;
   classifying the transaction as a safe transaction when the fraud score is less than the first threshold;
   determining whether the fraud score is greater than a second threshold,
      the first threshold being less than the second threshold; and
   classifying the transaction as an unsafe transaction when the fraud score is greater than the second threshold
      the information regarding the fraud score including information regarding whether the transaction has been classified as the safe transaction or the unsafe transaction.

9. A device comprising:
   one or more processors; and
   a memory comprising processor executable instructions that, when executed by the one or more processors, cause the one or more processors to:
      receive information associated with a transaction involving a consumer and a merchant;
      obtain network security information that indicates malicious network activity in a voice network or a data network,
         the network security information being associated with the consumer or the merchant and being collected independently of the information associated with the transaction involving the consumer and the merchant;
      determine an industry of the merchant based on the information associated with the transaction;

select a subset of rules, from a plurality of rules, based on the industry and the network security information;
use the subset of rules to generate a plurality of alarms;
correlate the plurality of alarms into the one or more cases;
generate a fraud score based on correlating the plurality of alarms into the one or more cases; and
output information regarding the fraud score to the merchant to assist the merchant in determining whether to accept, deny, or fulfill the transaction.

10. The device of claim 9, where the network security information comprises information identifying that the consumer, a device associated with the consumer, a device associated with the merchant, or a website associated with the merchant is associated with the malicious network activity in the voice network or the data network.

11. The device of claim 9, where the network security information includes information collected by a network analyzer, a firewall, an intrusion detection system, a router, a gateway, a proxy device, or a server before the transaction.

12. The device of claim 9, where the one or more processors are further to:
flag the transaction for review by a human analyzer based on the fraud score.

13. The device of claim 9,
where the one or more processors are further to:
generate alarm scores for the plurality of alarms; and
where, when calculating the fraud score, the one or more processors are to:
generate case scores for the one or more cases based on the alarm scores, and generate the fraud score based on the one or more case scores.

14. The device of claim 13,
where the plurality of alarms correspond to a plurality of transactions associated with a plurality of merchants, and
where the merchant is one of the plurality of merchants.

15. The device of claim 9, where, when selecting the subset of rules, the one or more processors are further to:
generate a profile associated with the transaction based on the industry, the network security information, and one or more of:
a dollar amount associated with the transaction,
a geographic location associated with the transaction, or
a type of browser used by the device of the consumer, and select the subset of rules based on the profile.

16. The device of claim 9, where, when outputting the information regarding the fraud score, the one or more processors are to:
determine policies associated with the merchant,
generate an alert, associated with the transaction, based on the fraud score and the policies,
the alert indicating that the merchant should accept, deny, or fulfill the transaction, and
output the alert to the merchant.

17. The device of claim 9, where, when generating the fraud Score, the one or more processors are to:
aggregate particular alarms associated with a plurality of transactions,
the particular alarms including the plurality of alarms,
sort the particular alarms into a plurality of cases based on attributes of the transaction,
the plurality of cases including the one or more cases,
generate case scores, for the plurality of cases, based on the at least one of the particular alarms, and
generate the fraud score based on the case scores.

18. A non-transitory computer-readable medium comprising:
one or more computer executable instructions that, when executed by at least one processor, cause the at least one processor to:
store a plurality of rules for detecting fraud;
receive information associated with a transaction involving a consumer and a merchant;
obtain network security information that indicates that the consumer has been involved in malicious activity in a voice network or in a data network,
the malicious activity being collected independently of the information associated with the transaction involving the consumer and the merchant;
determine an industry of the merchant based on the information associated with the transaction;
select a subset of rules, from the plurality of rules, based on the industry and the network security information;
generate a plurality of alarms based on the subset of rules;
correlate the plurality of alarms into one or more cases;
generate a fraud score based on correlating the plurality of alarms into the one or more cases; and
output information regarding the fraud score to the merchant to assist the merchant in determining whether to accept, deny, or fulfill the transaction.

19. The non-transitory computer-readable medium of claim 18, where the network security information comprises information identifying that the consumer or a device associated with the consumer is associated with the malicious network activity in the voice network or the data network.

20. The non-transitory computer-readable medium of claim 18, where the one or more computer executable instructions to select the subset of rules include:
one or more computer executable instructions that, when executed by the at least one processor, cause the at least one processor to:
generate a profile associated with the transaction based on the industry, the network security information, and historical information associated with previous transactions of the merchant or the consumer; and
select the subset of rules, from the plurality of rules, based on the profile.

* * * * *

UNITED STATES PATENT AND TRADEMARK OFFICE
CERTIFICATE OF CORRECTION

PATENT NO.         : 9,058,607 B2
APPLICATION NO.    : 12/970174
DATED              : June 16, 2015
INVENTOR(S)        : Visweswararao Ganti et al.

It is certified that error appears in the above-identified patent and that said Letters Patent is hereby corrected as shown below:

On the Title page and in the Specification, col. 1, in the title, replace the word "DETECTION" with the word "DETECT" as follows:

"USING NETWORK SECURITY INFORMATION TO DETECT TRANSACTION FRAUD"

Signed and Sealed this
Twenty-ninth Day of September, 2015

Michelle K. Lee
*Director of the United States Patent and Trademark Office*